(12) United States Patent
Warkentin et al.

(10) Patent No.: US 11,367,033 B2
(45) Date of Patent: *Jun. 21, 2022

(54) FLEET VEHICLE MANAGEMENT SYSTEMS AND METHODS

(71) Applicant: XRS Corporation, Eden Prairie, MN (US)

(72) Inventors: Colin D. Warkentin, St. Catharines (CA); Rakinder Kalirai, Burlington (CA); Christopher A. Sekula, Mississauga (CA)

(73) Assignee: XRS CORPORATION, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,926

(22) Filed: Aug. 23, 2018

(65) Prior Publication Data

US 2018/0365613 A1 Dec. 20, 2018

Related U.S. Application Data

(63) Continuation of application No. 14/071,382, filed on Nov. 4, 2013, now Pat. No. 10,255,575, which is a
(Continued)

(51) Int. Cl.
*G06Q 10/06* (2012.01)
*G06Q 10/08* (2012.01)
(Continued)

(52) U.S. Cl.
CPC ..... *G06Q 10/0639* (2013.01); *G06Q 10/0833* (2013.01); *G06Q 10/10* (2013.01);
(Continued)

(58) Field of Classification Search
None
See application file for complete search history.

(56) References Cited

U.S. PATENT DOCUMENTS

| 4,926,331 A | 5/1990 | Windle et al. |
| 5,155,689 A | 10/1992 | Wortham |

(Continued)

FOREIGN PATENT DOCUMENTS

| DE | 102004034060 A1 | 2/2006 |
| KR | 1020050038862 | 4/2005 |

(Continued)

OTHER PUBLICATIONS

Omnitracs, webpages, archives org, Sep. 28, 2015 https://web.archive.org/web/20150928233203/http://www.omnitracs.com/products (Year: 2015).*

(Continued)

*Primary Examiner* — Octavian Rotaru
(74) *Attorney, Agent, or Firm* — ArentFox Schiff LLP

(57) ABSTRACT

Some embodiments of a system for communicating vehicle information can provide equipment for use inside a fleet vehicle to facilitate prompt and efficient transfer of vehicle and driver information. In particular embodiments, the system may include an electronic onboard recorder mountable in a vehicle and a mobile communication device that is configured to wireless communication with the electronic onboard recorder.

16 Claims, 8 Drawing Sheets

Related U.S. Application Data continuation of application No. 13/174,331, filed on Jun. 30, 2011, now Pat. No. 8,626,568.

(51) Int. Cl.
  *G08G 1/00* (2006.01)
  *G07C 5/08* (2006.01)
  *G06Q 10/10* (2012.01)
  *G07C 5/00* (2006.01)

(52) U.S. Cl.
  CPC ............ *G07C 5/0858* (2013.01); *G08G 1/20* (2013.01); *G06Q 10/06* (2013.01); *G06Q 10/063* (2013.01); *G06Q 10/06398* (2013.01); *G07C 5/008* (2013.01)

(56) References Cited

U.S. PATENT DOCUMENTS

| | | |
|---|---|---|
| 5,359,528 A | 10/1994 | Haendel et al. |
| 5,394,136 A | 2/1995 | Lammers |
| 5,499,182 A | 3/1996 | Ousborne |
| 5,581,464 A | 12/1996 | Woll et al. |
| 5,612,875 A | 3/1997 | Haendel et al. |
| 5,694,322 A | 12/1997 | Westerlage et al. |
| 5,751,245 A | 5/1998 | Janky |
| 5,904,727 A | 5/1999 | Prabhakaran |
| 5,953,319 A | 9/1999 | Dutta et al. |
| 5,970,481 A | 10/1999 | Westerlage et al. |
| 6,070,123 A | 5/2000 | Beyer et al. |
| 6,108,591 A | 8/2000 | Segal et al. |
| 6,154,658 A | 11/2000 | Caci |
| 6,253,129 B1 | 6/2001 | Jenkins et al. |
| 6,282,490 B1 | 8/2001 | Nimura et al. |
| 6,317,668 B1 | 11/2001 | Thibault |
| 6,408,232 B1* | 6/2002 | Cannon .................. G08G 1/017 701/32.4 |
| 6,421,590 B2 | 7/2002 | Thibault |
| 6,496,775 B2 | 12/2002 | McDonald, Jr. et al. |
| 6,505,106 B1 | 1/2003 | Lawrence et al. |
| 6,611,755 B1 | 8/2003 | Coffee et al. |
| 6,639,898 B1 | 10/2003 | Dutta et al. |
| 6,714,857 B2 | 3/2004 | Kapolka et al. |
| 6,718,263 B1 | 4/2004 | Glass et al. |
| 6,871,137 B2 | 3/2005 | Scaer et al. |
| 6,880,016 B1 | 4/2005 | Van Der Heijden et al. |
| 6,904,363 B2 | 6/2005 | Inbar et al. |
| 6,925,308 B2* | 8/2005 | Goldsmith ......... H04B 7/18571 455/566 |
| 6,938,099 B2 | 8/2005 | Morton et al. |
| 6,947,737 B2 | 9/2005 | Massie et al. |
| 7,006,845 B2 | 2/2006 | Simon |
| 7,024,199 B1 | 4/2006 | Massie et al. |
| 7,043,365 B2* | 5/2006 | Inbar .................. G08G 1/20 455/457 |
| 7,068,992 B1 | 6/2006 | Massie et al. |
| 7,089,322 B1 | 8/2006 | Stallman |
| 7,117,075 B1 | 10/2006 | Larschan et al. |
| 7,136,642 B1 | 11/2006 | Massie et al. |
| 7,162,238 B1 | 1/2007 | Massie et al. |
| 7,230,944 B1 | 6/2007 | Massie et al. |
| 7,305,289 B2 | 12/2007 | Gessner et al. |
| 7,340,332 B2 | 3/2008 | Underdahl et al. |
| 7,356,392 B2 | 4/2008 | Hubbard et al. |
| 7,363,129 B1 | 4/2008 | Barnicle et al. |
| 7,389,178 B2 | 6/2008 | Raz et al. |
| 7,401,741 B2 | 7/2008 | Thayer |
| 7,525,421 B2 | 4/2009 | Levesque et al. |
| 7,561,054 B2 | 7/2009 | Raz et al. |
| 7,725,216 B2* | 5/2010 | Kim .................. G07C 5/008 701/1 |
| 7,784,707 B2 | 8/2010 | Witty et al. |
| 7,802,729 B2 | 9/2010 | Thayer |
| 8,032,277 B2 | 10/2011 | Larschan et al. |
| 8,065,048 B2 | 11/2011 | Bertosa et al. |
| 8,065,342 B1 | 11/2011 | Borg et al. |
| 8,301,332 B2 | 10/2012 | Rawle |
| 8,306,739 B2 | 11/2012 | Miller |
| 8,412,401 B2 | 4/2013 | Bertosa |
| 8,442,508 B2 | 5/2013 | Harter et al. |
| 8,447,231 B2 | 5/2013 | Bai et al. |
| 8,589,018 B2 | 11/2013 | Sarnacke et al. |
| 8,600,610 B2 | 12/2013 | Bertosa et al. |
| 8,604,920 B2 | 12/2013 | Armitage et al. |
| 8,626,568 B2* | 1/2014 | Warkentin ........... G07C 5/0858 705/7.38 |
| 8,751,563 B1 | 6/2014 | Warden et al. |
| 8,788,137 B2 | 7/2014 | Bertosa et al. |
| 8,788,139 B2 | 7/2014 | Fedorchuk et al. |
| 8,799,058 B2 | 8/2014 | Golembiewski |
| 8,849,492 B2 | 9/2014 | Uno |
| 8,854,199 B2 | 10/2014 | Cook et al. |
| 8,886,391 B2 | 11/2014 | Bertosa et al. |
| 8,909,416 B2 | 12/2014 | Chen et al. |
| 8,915,738 B2 | 12/2014 | Mannino |
| 8,958,943 B2 | 2/2015 | Bertosa et al. |
| 8,965,670 B2 | 2/2015 | Peterson et al. |
| 8,970,359 B2 | 3/2015 | Barth et al. |
| 8,989,959 B2 | 3/2015 | Plante et al. |
| 9,147,335 B2* | 9/2015 | Raghunathan ......... G08G 1/207 |
| 9,262,934 B2* | 2/2016 | Mohn ............... G06Q 10/0631 |
| 9,297,564 B2 | 6/2016 | Wagaman et al. |
| 10,134,000 B2 | 11/2018 | Warkentin et al. |
| 10,157,384 B2 | 12/2018 | Lesesky |
| 10,255,575 B2* | 4/2019 | Warkentin ............... G08G 1/20 |
| 2002/0032018 A1 | 3/2002 | Morton et al. |
| 2002/0035421 A1* | 3/2002 | Warkentin ............. G07C 5/008 709/200 |
| 2002/0160771 A1 | 10/2002 | Massie et al. |
| 2003/0028298 A1 | 2/2003 | Macky et al. |
| 2003/0069784 A1* | 4/2003 | Banerjee ................ G06Q 30/04 705/13 |
| 2004/0039526 A1 | 2/2004 | Inbar et al. |
| 2004/0162844 A1 | 8/2004 | Thome et al. |
| 2004/0243285 A1 | 12/2004 | Gounder |
| 2005/0096809 A1* | 5/2005 | Skeen .................... G07C 5/008 701/31.4 |
| 2005/0171692 A1* | 8/2005 | Hamblen ............... G07C 5/085 701/468 |
| 2005/0209778 A1 | 9/2005 | Inbar et al. |
| 2006/0040239 A1 | 2/2006 | Cummins et al. |
| 2006/0047543 A1 | 3/2006 | Moses |
| 2006/0059037 A1* | 3/2006 | Ivey ...................... G07B 15/00 705/13 |
| 2006/0095175 A1 | 5/2006 | Dewaal et al. |
| 2006/0184613 A1 | 8/2006 | Steinessen et al. |
| 2006/0200286 A1 | 9/2006 | Kumagai et al. |
| 2007/0038338 A1 | 2/2007 | Larschan et al. |
| 2007/0038343 A1 | 2/2007 | Larschan et al. |
| 2007/0038347 A1 | 2/2007 | Larschan et al. |
| 2007/0038348 A1 | 2/2007 | Larschan et al. |
| 2007/0038349 A1 | 2/2007 | Larschan et al. |
| 2007/0038350 A1 | 2/2007 | Larschan et al. |
| 2007/0038351 A1 | 2/2007 | Larschan et al. |
| 2007/0038352 A1 | 2/2007 | Larschan et al. |
| 2007/0038353 A1 | 2/2007 | Larschan et al. |
| 2007/0050108 A1* | 3/2007 | Larschan ............... G07C 5/085 701/33.4 |
| 2007/0202483 A1 | 8/2007 | Castelli et al. |
| 2007/0267473 A1* | 11/2007 | Thayer ................ G07C 5/0858 235/375 |
| 2007/0267509 A1 | 11/2007 | Witty et al. |
| 2008/0082221 A1 | 4/2008 | Nagy |
| 2008/0188217 A1* | 8/2008 | Harter .................... G07C 5/008 455/426.1 |
| 2008/0252487 A1 | 10/2008 | McClellan et al. |
| 2008/0269978 A1* | 10/2008 | Shi ........................ G07C 5/008 701/29.5 |
| 2009/0051510 A1 | 2/2009 | Follmer et al. |
| 2009/0164798 A1* | 6/2009 | Gupta ..................... G07C 9/38 713/186 |
| 2009/0237245 A1 | 9/2009 | Brinton et al. |
| 2009/0276117 A1 | 11/2009 | Raichle et al. |

(56) References Cited

U.S. PATENT DOCUMENTS

| | | |
|---|---|---|
| 2010/0088163 A1 | 4/2010 | Davidson et al. |
| 2010/0210212 A1 | 8/2010 | Sato |
| 2010/0293081 A1 | 11/2010 | Liu et al. |
| 2011/0125365 A1 | 5/2011 | Larschan et al. |
| 2011/0125663 A1 | 5/2011 | Kraft |
| 2012/0065815 A1 | 3/2012 | Hess |
| 2012/0072109 A1 | 3/2012 | Waite et al. |
| 2012/0072267 A1 | 3/2012 | Gutierrez, Jr. et al. |
| 2012/0166346 A1 | 6/2012 | Machlab et al. |
| 2012/0194679 A1 | 8/2012 | Nehowig et al. |
| 2012/0295230 A1 | 11/2012 | Esposito |
| 2013/0006715 A1 | 1/2013 | Warkentin et al. |
| 2013/0166358 A1 | 6/2013 | Parmar et al. |
| 2014/0045147 A1 | 2/2014 | Mohn et al. |
| 2014/0045427 A1 | 2/2014 | Mohn et al. |
| 2014/0045428 A1 | 2/2014 | Mohn et al. |
| 2014/0045429 A1 | 2/2014 | Mohn et al. |
| 2014/0046531 A1 | 2/2014 | Mohn et al. |
| 2014/0046569 A1 | 2/2014 | Mohn et al. |
| 2014/0046570 A1 | 2/2014 | Mohn et al. |
| 2014/0046710 A1 | 2/2014 | Mohn et al. |
| 2014/0047343 A1 | 2/2014 | Mohn et al. |
| 2014/0047347 A1 | 2/2014 | Mohn et al. |
| 2014/0058802 A1 | 2/2014 | Warkentin et al. |
| 2018/0365613 A1 | 12/2018 | Warkentin et al. |

FOREIGN PATENT DOCUMENTS

| | | |
|---|---|---|
| KR | 1020110011450 | 2/2011 |
| WO | 97/13208 A1 | 4/1997 |
| WO | 0022595 A1 | 4/2000 |
| WO | WO 2007/022154 | 2/2007 |
| WO | WO 2008/107514 | 9/2008 |
| WO | 2013003663 A2 | 1/2013 |
| WO | WO 2013/003663 | 1/2013 |

OTHER PUBLICATIONS

Canadian Office Action dated Jun. 13, 2016 issued in Canadian Patent Application No. 2,839,715.

Canadian Office Action dated May 13, 2015 issued in Canadian Patent Application No. 2,839,715.

Canadian Office Action issued in Canadian Patent Application No. 2,839,715 dated Jun. 8, 2018.

CarChip Pro OBDII Based Vehicle Data Logger and Software, archives org, Mar. 31, 2010, http://www.carchip.com/product_docs/8226_specs_carchippro.pdf (4 pages).

Office Action issued in Canadian Patent Application No. 2,839,715 dated Jun. 5, 2017 (5 pages).

Synchronization—definition of synchronization by The Free Dictionary, https://www.thefreedictionary.com/synchronization, last accessed Mar. 13, 2017 (3 pages).

"OBD II to USB cable pinout," elmelectronics.com, retrieved from http://pinoutsguide.com/CarElectronics/obd_ii_usb_cable_pinout.shtml on Feb. 26, 2014, 2 pp.

A complete guide to hacking your vehicle bus on the cheap and easy, part 1, hardware interface, the ksmith webpages, Mar. 22, 2013 https://theksmith.com/software/hack-vehicle-bus-cheap-easy-part-1/.

Department of Transportation, Rules and Regulations, Federal Register Part II, vol. 75, No. 64, Apr. 5, 2010, 46 pp.

EOBR Compliance on Android, Windows Mobile & Blackberry devices, by Xata Road, Youtube, uploaded by XataNation on May 27, 2011, 5 pp. http://www.youtube.com/watch?v=8XEC5ALV7uE&feature=bf_prev&list=PL6CEEOD5DF5454180.

EOBR Compliance on Android, Windows Mobile and Blackberry devices—Xata, part 1, Youtube, uploaded by XataNation on May 27, 2011 http://www.youtube.com/watch?v=8XEC5ALV7uE&feature=bf_prev&list=PL6CEE0D5DF5454180.

EOBR Compliance on Android, Windows Mobile and Blackberry devices—Xata, part 2, Youtube, uploaded by XataNation on May 27, 2011 http://www.youtube.com/watch?v=8XEC5ALV7uE&feature=bf_prev&list=PL6CEE0D5DF5454180.

EOBR Compliance on Android, Windows Mobile and Blackberry devices, by Xata Road, Youtube, uploaded by XataNation on May 27, 2011 http://www.youtube.com/watch?v=8XEC5ALV7uE.

EOBR Install, Xata Turnpike Routetracker, Youtube, uploaded by XataNation on Jul. 21, 2011 http://www.youtube.com/watch?y=67mGY_5CYTEMeature=bf_next&list=PL6CEE0D5DF5454180.

EOBR Install, Xata Turnpike Routetracker, Youtube, uploaded by XataNation on Jul. 21, 2011,1 p. http://www.youtube.com/watch?v=67mGY_5CYTE&feature=bf_next&list=PL6CEE0D5DF5454180.

EOBR Rules made easy with Xata Road Science, Youtube, uploaded by XataNation on May 5, 2011 http://www.youtube.com/watch?y=HIN61H9MABs&feature=bf_next&list=PL6CEE0D5DF5454180.

EOBR Rules made easy with Xata Road Science, Youtube, uploaded by XataNation on May 5, 2011, 1 p. http://www.youtube.com/watch?-v=HIN61H9MABs&feature=bf_next&list=PL6CEEOD5DF5454180.

EOBR testimonial from Intermodal C&K Trucking, for Xata Turnpike, Youtube, Uploaded by XataNation on Jun. 29, 2011 http://www.youtube.com/watch?y=Xg4y5KauJi0.

EOBR testimonial from Intermodal C&K Trucking, for Xata Turnpike, Youtube, Uploaded by XataNation on Jun. 29, 2011, 2 pp. http://www.youtube.com/watch?v=Xg4y5KauJiO.

Fleet Management and EOBR—XATA Turnpike on Verizon, Youtube, uploaded by XataNation on Jun. 29, 2011 http://www.youtube.com/watch?y=t-_zsdixC20&feature=BFa&list=PL6CEE0D5DF5454180.

Fleet Management and EOBR—Xata Turnpike on Verizon, Youtube, uploaded by XataNation on Jun. 29, 2011, 1 p. http://www,youtube.com/watch?v=t-_zsdixC20&feature=BFa&list=PL6CEE0D5DF5454180.

Infrared Data Association—Wikipedia, the free encyclopedia, archives org, Mar. 18, 2010 https://web.archive.org/web/20100318050327/http://en.wikipedia.org/wiki/Infrared_Data_Association.

International Search Report and Written Opinion of international application No. PCT/US2012/044772, dated Jan. 21, 2013, 10 pp.

J.J. Keller's Encompass, "Phone & Hardware Requirements," May 5, 2011, 1 pp.

On Board Communications, FleetTraksTM Web Application Guide, 2007, 36 pp. http://www.onboardcommunications.com/2007%20Web%20Application%20Useel/020Guide.pdf.

On Board Communications, SafetyTraksTM Web Application Guide, 2008, 17 pp. http://info.safetytraks.com/safetytraksusersmanual.pdf.

On Board Communications, Web Application Guide, 2008, 38 pp. http://www.dteps.cotn/2008_Web_Application_User_Guide.pdf.

OnBoard Communications, OBC9000TM Installation Manual, in U.S. Appl. No. 13/174,331 on Nov. 21, 2012, 11 pp. http://www.onboardcommunications.com/instaii/OBC9000_Install.pdf.

'On-Board Technology—Performance Management' [online]. J.J. Keller's Encompass, J.J. Keller & Associates, Inc., 2010 [retrieved on Jul. 22, 2011], 2 pp. http://www.kellerencompass.com/online/onboard_rec/index.aspx.

Predestination Transportation Chooses XATA for Fleet Management, Xata Webpages Mar. 12, 2010, 2 pp. http://xatadev2.firebrandmg.com/news/news-press-releases-events-and-investor-news/2010/12-march/.

Pritchett Trucking Inc. Renews Contract for Mobile Max by Xata, Xata Webpages Mar. 16, 2010, 2 pp. http://xatadev2,firebrandmg.com/news/news-press-releases-events-and-investor-news/2010/16-march/.

Toddler activity Twin Adventures, wordpress webpages, May 22, 2013 https://web.archive.org/web/20130522145513/http://twingirlmommy.wordpress.com/tag/toddler-activity/.

TpMobile—Android Apps on Google Play, Google Play Webpages, Apr. 2011, 1 p. https://play.google.com/store/apps/details?id=com.TPG.tpMobile&hl=en.

TREQ-M4, Mobile Data Terminal Manual, Beijer Electronics, M01-003-00 Rev 02, Mar. 23, 2011, 98 pp. http://www.beijerelectronicsinc.com/pdf/qsi_treq-m4_user_manual.pdf.

(56) References Cited

OTHER PUBLICATIONS

Turnpike Global Technologies, Automating the Transportation Industry, publicly available before Jun. 30, 2010, 4 pp.
Turnpike Global Technologies, Driver's Manual 3.5—for Motorola Phone, in U.S. Appl. No. 13/174,331 on Nov. 21, 2012, 9 pp. http://xrscorp.com/media/docs/drivers-manual-motorola.pdf.
Turnpike Global Technologies, PowerPoint presentation: Introduction, publicly available before Jun. 30, 2010, 13 pp.
Turnpike Global Technologies, PowerPoint presentation: Trucking and Technology, publicly available before Jun. 30, 2010, 10 pp.
Turnpike Global Technologies, PowerPoint presentation: Turnpike Direct Sprint Sales Intro Jan. 2008, 18 pp.
Turnpike Global Technologies, PowerPoint presentation: Turnpike Global Technologies, Corporate overview, publicly available before Jun. 30, 2010, 23 pp.
Turnpike Global Technologies, PowerPoint presentation: Turnpike Global Technologies, RouteTracker, publicly available before Jun. 30, 2010, 25 pp.
Turnpike Global Technologies, Route Tracker Installation Guide Version 1.0, publicly available before Jun. 30, 2010, 7 pp.
Winn-Dixie Enhances 450-Truck Fleet with XATANET, Xata webpages, Apr. 21, 2011, 1 p. http://xatadev2.firebrandmg.com/news/news-press-releases-events-and-inventor-new s/2010/21-April/.
XATA—XRS Nation Fleet Management, Overview of posted videos, Youtube, Apr. 2011-2012.
XATA—XRS Nation Fleet Management, Overview of posted videos, Youtube, Apr. 2011-2012, 1 p.
XATA and SpeedGauge Partner to Provide Enhanced Speed Data for Increased Safety, Xata webpages, Mar. 4, 2010, 2 pp. http://xatadev2.firebrandmg.com/news/news-press-releases-.
Xata tp mobile driver handbook for android, in U.S. Appl. No. 13/174,331 on Nov. 21, 2012, 17 pp. http://xrscorp.com/media/docs/drivers-manual-androld.pdf.
Xata tp mobile driver handbook for windows mobile, in U.S. Appl. No. 13/174,331 on Nov. 21, 2012, 16 pp. http://xrscorp.com/media/docs/drivers-manual-windows-mobile.pdf.
Office Action issued in Canadian Patent Application No. 2,839,715 dated Sep. 18, 2018.
Canadian Office Action issued in corresponding Canadian Application No. 2,839,715 dated Aug. 15, 2019. (6 pages).
Canadian Office Action in corresponding Canadian Application No. 2,839,715 dated May 19, 2021.

\* cited by examiner

FLEET VEHICLE MANAGEMENT SYSTEMS AND METHODS

CROSS-REFERENCE TO RELATED APPLICATIONS

This application is a continuation of U.S. patent application Ser. No. 14/071,382, filed Nov. 4, 2013, which is a continuation of U.S. patent application Ser. No. 13/174,331, filed Jun. 30, 2011, now U.S. Pat. No. 8,626,568, issued Jan. 7, 2014, the entire contents of which are incorporated by reference herein.

TECHNICAL FIELD

This specification relates to transportation fleet management, such as a system for fleet vehicle management that records particular vehicle and driver information for subsequent communication, for example, to a remote device.

BACKGROUND

A number of commercial companies and government institutions maintain a fleet of vehicles and have an interest in keeping track of the vehicles and shipments, as well as the performance and well-being of their drivers. These parties frequently equip their fleet vehicles with devices configured to track the vehicles' geographic locations, speeds, headings, cargo temperature, engine performance parameters, and other data. Such information is used, for example, to maintain the vehicles, estimate delivery times, provide warning of possible damage to cargo, and to evaluate driver performance.

Some regulatory agencies also have an interest in fleet vehicle information, such as the number of miles a delivery vehicle has travelled since its last safety inspection, or the number of hours a driver has been on duty since he or she last rested. In some cases, this information was traditionally recorded on paper (e.g., driver log books) or in proprietary electronic formats. In either case, such information can be inconvenient to access or share with regulatory inspectors or other third parties.

SUMMARY

Some embodiments of a system for communicating fleet vehicle information can provide equipment for use inside a fleet vehicle to facilitate prompt and efficient transfer of vehicle and driver information. In particular embodiments, the system can generate electronic reports that provide driver identification information, hours of service information, and (optionally) vehicle-related information, and such electronic reports can be readily communicated to a remote computer device in a number of different manners. For example, in some embodiments, the system may include an electronic onboard recorder mountable in a vehicle and a mobile communication device (e.g., a cellular phone in particular embodiments) that is configured to provide short-range, two-way wireless communication (e.g., Bluetooth communication in particular embodiments) with the electronic onboard recorder. In such circumstances, a driver or other system user can operate the system to share a driver summary electronic report or other information by exporting the electronic information via a data port (e.g., a USB port in particular embodiments) of the electronic onboard recorder, by transferring the electronic information via a cellular link established by the mobile communication device, or both.

Particular embodiments described herein may include a system for communicating fleet vehicle information including an electronic onboard recorder unit and a portable wireless display unit. The electronic onboard recorder unit may be configured to mount inside a vehicle and provide a wired connection to the vehicle for gathering data during operation of the vehicle. The electronic onboard recorder unit can be free of any user interface display and may include a short-range wireless communication device to wirelessly communicate vehicle usage information to a separate device, such as the portable wireless display unit. The electronic onboard recorder unit may also include a data connection port (e.g., a USB port in some embodiments) configured to removably receive a data cable of a remote computer device. The portable wireless display unit may include a short-range wireless communication device to wirelessly communicate with the electronic onboard recorder unit when the electronic onboard recorder unit and the portable wireless display unit are both positioned inside the vehicle. Also, the portable wireless display unit may include a cellular communication device configured to provide a cellular communication link with a remote system. Furthermore, the portable wireless display unit may include a user interface comprising a display device. Also, the portable wireless display unit may include a computer-readable memory module to store a driver summary electronic report, which may be generated by the portable wireless display unit in response to wirelessly receiving the vehicle usage information from the electronic onboard recorder unit mounted to the vehicle. The driver summary electronic report may include identification information for a driver and hours or service information for the driver. In response to input on the user interface of the portable wireless display unit indicative of a request to export the driver summary electronic report from the electronic onboard recorder unit mounted to the vehicle, the portable wireless display unit may be configured to wirelessly transfer the driver summary electronic report to the electronic onboard recorder unit mounted to the vehicle for exporting the driver summary electronic report via the data connection port of the electronic onboard recorder unit to the remote computer device.

In some embodiments, a system for communicating fleet vehicle information may include an electronic onboard recorder unit configured to mount inside a vehicle and provide a wired connection to the vehicle for gathering data during operation of the vehicle. The electronic onboard recorder unit may be free of a user interface display. Also, the electronic onboard recorder unit may include a short-range wireless communication device to wirelessly communicate vehicle usage information to a second device when the second device is positioned inside the vehicle. The system may also include a portable wireless display unit having a short-range wireless communication device to wirelessly communicate with the electronic onboard recorder unit when the electronic onboard recorder unit and the portable wireless display unit are both positioned inside the vehicle. The portable wireless display unit may also include a long-range communication device configured to provide a cellular or satellite communication link with a remote system. The portable wireless display unit may further include a user interface comprising a display device that displays driver hours of service information in response to wirelessly receiving the vehicle usage information from the electronic onboard recorder unit mounted to the vehicle. The electronic onboard recorder unit and the portable wireless display unit may provide two-way wireless communication such that the portable wireless display unit wirelessly receives vehicle usage information from the electronic onboard recorder unit and the electronic onboard recorder unit wirelessly receives driver identification information from the portable wireless display unit.

In certain embodiments, a system for communicating fleet vehicle information may include an electronic onboard recorder unit configured to mount inside a vehicle and provide a wired connection to the vehicle for gathering data during operation of the vehicle. The electronic onboard recorder unit may include a short-range wireless communication device to wirelessly communicate vehicle usage information to a second device when the second device is positioned inside the vehicle. The electronic onboard recorder unit may also include a USB connection port configured to removably receive a USB data cable of a remote computer device. The system may further include a portable wireless display unit comprising a short-range wireless communication device to wirelessly communicate with the electronic onboard recorder unit when the electronic onboard recorder unit and the portable wireless display unit are both positioned inside the vehicle. The portable wireless display unit may also include a long-range communication device configured to provide a cellular or satellite communication link with a remote system. The portable wireless display unit may also include a user interface including a display device, and a computer-readable memory module to store a driver summary electronic report including identification information for a driver and hours or service information for the driver. The electronic onboard recorder unit may output the driver summary electronic report via the USB connection port in response to user input on the user interface of the portable wireless display unit. Also, the portable wireless display unit may output the driver summary electronic report via the cellular or satellite communication link to the remote system.

Some embodiments described herein may include a computer-implemented method for providing a driver summary electronic report. The method may include wirelessly communicating vehicle usage information from an electronic onboard recorder unit mounted to a vehicle to a portable wireless display unit. The electronic onboard recorder unit may have a wired connection to the vehicle. The method may also include wirelessly receiving, at the electronic onboard recorder unit, a driver summary electronic report from the portable wireless display unit, the driver summary electronic report having been generated by the portable wireless display unit in response to the electronic onboard recorder unit wirelessly communicating the vehicle usage information. The driver summary electronic report may include identification information for a driver and hours or service information for the driver. The method may further include removably receiving a USB data cable in a USB connection port of the electronic onboard recorder unit mounted to the vehicle. Also, the method may include, in response to a user request input to the portable wireless display unit, transferring the driver summary electronic report from the electronic onboard recorder unit mounted to the vehicle via the data cable to a remote computer device.

In further embodiments, a computer-implemented method for providing a driver summary electronic report may include wirelessly receiving, at a portable wireless display unit, vehicle usage information from an electronic onboard recorder unit mounted to a vehicle and having a wired connection to the vehicle. The method may also include storing a driver summary electronic report in a computer-readable memory module of the portable wireless display unit configured to wirelessly communicate with the electronic onboard recorder unit mounted to the vehicle. The driver summary electronic report may be generated by the portable wireless display unit in response to wirelessly receiving the vehicle usage information from the electronic onboard recorder unit mounted to the vehicle. The driver summary electronic report may include identification information for a driver and hours or service information for the driver. The method may also include receiving user input on the portable wireless display unit indicative of a request to export the driver summary electronic report from the electronic onboard recorder unit mounted to the vehicle. The method may further include wirelessly transferring the driver summary electronic report from the portable wireless display unit to the electronic onboard recorder unit mounted to the vehicle for exporting the driver summary electronic report via a removable data cable to a remote computer device, Some embodiments of a computer-implemented method for providing a driver summary electronic report may include wirelessly communicating vehicle usage information from an electronic onboard recorder unit mounted to a vehicle to a portable wireless display unit. The electronic onboard recorder unit may have a wired connection to the vehicle. The method may also include storing a driver summary electronic report in a computer-readable memory module of the portable wireless display unit configured to wirelessly communicate with the electronic onboard recorder unit mounted to the vehicle. The driver summary electronic report may generated by the portable wireless display unit in response to wirelessly receiving the vehicle usage information from the electronic onboard recorder unit mounted to the vehicle. The driver summary electronic report may include identification information for a driver and hours or service information for the driver. The method may further include receiving user input on the portable wireless display unit indicative of a request to export the driver summary electronic report from the electronic onboard recorder unit mounted to the vehicle. The method may also include wirelessly transferring the driver summary electronic report from the portable wireless display unit to the electronic onboard recorder unit mounted to the vehicle. The method may further include removably receiving a data cable in a corresponding port of the electronic onboard recorder unit mounted to the vehicle. Also, the method may include transferring the driver summary electronic report from the electronic onboard recorder unit mounted to the vehicle via the data cable to a remote computer device.

The systems and techniques described here may provide one or more of the following benefits. First, a system for communicating vehicle information can provide an electronic onboard recorder mountable in a vehicle and a mobile communication device (e.g., a cellular phone in particular embodiments) that is configured to provide wireless communication with the electronic onboard recorder. As such, system can include a plurality of separately housed devices that are each configured to output electronic reports in different manners.

Second, in some embodiments of the system, the electronic onboard recorder can be equipped with an external data port (e.g., a USB connection port) so that the electronic onboard recorder can output driver summary electronic reports or other electronic files via a hardwired connection to a remote computer. For example, a vehicle inspector can carry a portable computer device or portable storage device, and the driver or the inspector can plug the inspector's device into the data port of the electronic onboard recorder so as to retrieve a driver summary electronic report or other electronic files via a hardwired connection to the unit mounted in the vehicle.

Third, particular embodiments of the system can provide a mobile communication device (e.g., a cellular phone in particular embodiments) that provides short-range, two wireless communication with an electronic onboard recorder mounted in a vehicle. In such circumstances, not only does the electronic onboard recorder wirelessly communicate information to the mobile communication device, but the mobile communication device can also transmit information back to the electronic onboard recorder. Therefore, one or more electronic files containing vehicle or driver information can be synced between the two separate devices for purposes of outputting the files in a number of optional manners.

Fourth, in some embodiments, the electronic onboard recorder mounted in the vehicle can be constructed as a displayless unit that is free of any user interface display. Such a construction can reduce the size of the electronic onboard recorder, provide for simplified installation (and, optionally, concealed installation inside the vehicle), and reduce the manufacturing complexities for the electronic onboard recorder. In these circumstances, the user interface of the mobile communication device can serve as the user interface for the system (including the electronic onboard recorder). As such, the mobile communication device can be separately housed from its corresponding electronic onboard recorder so that the mobile communication device can be carried by the vehicle driver or other user outside of the vehicle while the electronic onboard recorder remains mounted inside the vehicle. Moreover, because the mobile communication device is portable relative to its respective electronic onboard recorder unit, the driver can view or input vehicle or driver information on the user interface of the mobile communication device both when the driver s seated inside the vehicle and when the driver positioned outside the vehicle in proximity thereto (e.g., while inspecting the exterior of the vehicle, refueling, or sitting in a nearby building).

Fifth, in some embodiments of the system, the electronic onboard recorder can be configured to detect the particular type of communications protocol employed by vehicle, and automatically adapt to the detected protocol in order to communicate with an engine control module of the vehicle. As such, the electronic onboard recorder can be installed in any one of a number of different types of vehicles, and the installer's act of connecting the electronic onboard recorder to the vehicle's engine control module will prompt the control circuitry of the electronic onboard recorder to automatically recognize the type of vehicle in which it is installed.

Sixth, in some embodiments of the system, the electronic onboard recorder can house one or more accelerometers therein so as to detect particular types of vehicle movement, such as hard brakes, acceleration, and lane changes. Instances of this type of vehicle movement can be recorded by the electronic onboard recorder can communicated to a control center (e.g., via the mobile communication device) for purposes of safety monitoring by a fleet manager or other system user.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 1:
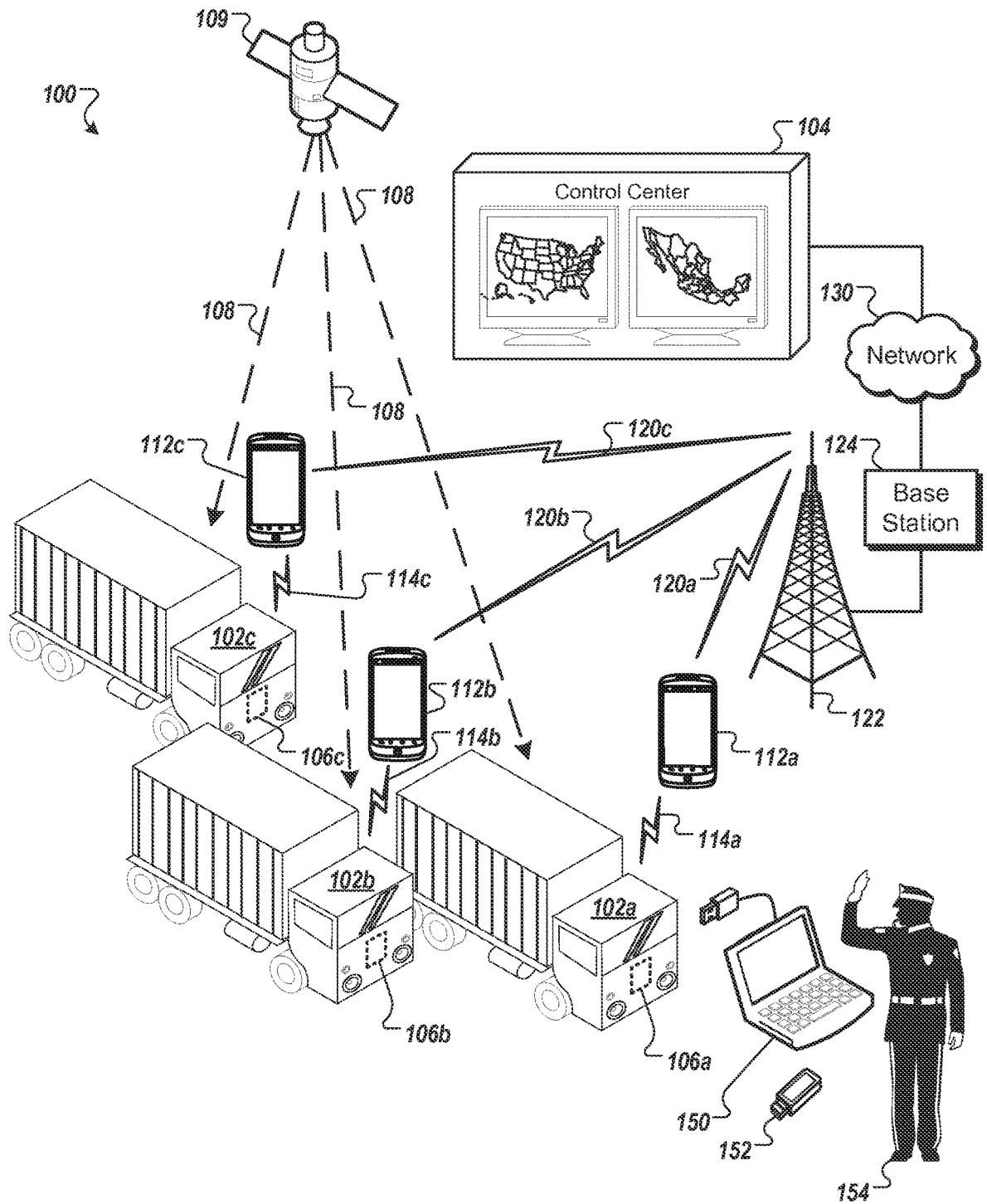
FIG. 1 is a diagram that shows an example of a fleet management system in accordance with some embodiments.

Referring to FIG. 1, some embodiments of a fleet management system 100 can include a collection of vehicles 102*a*-102*c* equipped with electronic onboard recorder units 106*a*-*c* and accompanying mobile communication devices 112*a*-*c*, which can be used for communication with a control center 104. In particular embodiments, the control center 104 represents a physical or conceptual location in which information about the vehicles 102*a*-102*c* (and the vehicles drivers) is collected and used. For example, the control center 104 may access information gathered from the vehicles 102*a*-102*c* in order to identify and locate the vehicle 102*a*-102*c* carrying particular shipments, and estimate the remaining time until delivery. Also, the control center 104 can collect the information about the vehicles 102*a*-102*c* so as to monitor the location, speed, heading, and planned route of particular vehicles and their respective shipments. Moreover, the control center 104 can collect the information about the drivers of the vehicles 102*a*-102*c* so as to monitor the duty status, hours of service, and other characteristics of each driver.

At least some of aforementioned vehicle information is gathered by the electronic onboard recorder units 106*a*-106*c* mounted in each of the vehicles 102*a*-102*c*, respectively. The electronic onboard recorder units 106*a*-106*c* are electronic devices that collect and record information about the vehicles' 102*a*-102*c*, location, speed, operational parameters, acceleration, operating hours, and other vehicle-related information. For example, the electronic onboard recorder units 106*a*-106*c* can receive location information in he form of global positioning system (GPS) signals 108 from at least one GPS satellite 109 to determine the locations of their respective vehicles 102*a*-102*c*, Also, the electronic onboard recorder units 106*a*-106*c* can be configured to electrically connect with an engine control module (refer to HG. 2) so as to receive vehicle operation information (e.g., speed, operational parameters, acceleration/braking data, fuel usage, and the like). As described below in connection with FIGS. 2 and 3, each electronic onboard recorder unit 106a-106c can be equipped with a data connection port (e.g., a USB port in this embodiment) for purposes of readily exporting driver information electronic reports or other electronic data to remote devices of regulatory inspectors or other approved parties.

Still referring to FIG. 1, each of the electronic onboard recorder units 106a-106c can communicate with a corresponding mobile communication device 112a-112c, which may also be positioned inside or in dose proximity to the vehicle 102a-c. In particular, each of the mobile communication device 112a-112c can be portably carried by the driver of a vehicle 102a-c, respectively, so that the mobile communication device 112a-112c is configured to wirelessly communicate with the electronic onboard recorder unit 106a-106c, respectively, mounted in the vehicle. For example, during use of the fleet vehicle 102a, the electronic onboard recorder unit 106a and the mobile communication device 112a can wirelessly communicate while both the unit 106a and the device 112a are positioned inside the vehicle 102a. In such circumstances, the electronic onboard recorder unit 106a and the corresponding mobile communication device 112a can operate as a system 110a (FIGS. 2-3) for communicating information about the vehicle 102a and its driver.

In this embodiment, the electronic onboard recorder unit 106a communicates with a mobile communication device 112a over a wireless link 114a and provides a user interface for the electronic onboard recorder unit 106a. Similarly, the electronic onboard recorder units 106b and 106c communicate with a mobile communication device 112b and 112c, respectively, over a wireless link 114b and 114c. In those embodiments in which the mobile communication device 112a-c provides the user interface for the respective electronic onboard recorder unit 106a-c, each electronic onboard recorder unit 106a-c can be constructed as a displayless unit that is free of any user interface display mounted thereto, thereby reducing the size of the electronic onboard recorder unit 106a (eg., providing for simplified installation and, optionally, concealed installation inside the vehicle) and reducing the manufacturing complexities for the electronic onboard recorder unit 106a. In some implementations, the mobile communications devices 112a-112c can be cellular telephones, satellite telephones, portable computers, tablet computers, personal digital assistants (PDAs), or another mobile computing device that is programmed to wirelessly communicate with one or more of the electronic onboard recorder units 106a-c. As such, each mobile communication device 112a-112c can be separately housed from its corresponding electronic onboard recorder unit 106a-106c so that the mobile communication device 112a-112c can be carried by the vehicle driver or other user outside of the vehicle 102a-102c while the electronic onboard recorder unit 106a-106c remains mounted inside the vehicle 102a-102c. In some implementations, the wireless links 114a-114c can be short-range wireless communications links, such as Bluetooth, wireless Ethernet (WiFi), ZigBee, near-field communications (NFC), infrared (IrDA), or any other suitable short-range wireless communication link. In such circumstances, each mobile communication device 112a-112c can display information in response to the vehicle data wirelessly communicated from the respective electronic onboard recorder unit 106a-106c while both items are positioned inside the vehicle 102a-c (e.g., while the electronic onboard recorder unit 106a is mounted inside the vehicle 102a and the mobile communication device 112a is carried by the driver in the vehicle or otherwise temporarily placed inside the vehicle cabin). Moreover, because each mobile communication device 112a-112c is portable relative to its respective electronic onboard recorder unit 106a-106c, the driver or other human user can view or input vehicle-related information on the user interface of the mobile communication device 112a-112c both when the driver is seated inside the vehicle and when the driver positioned outside the vehicle in proximity thereto (e.g., while inspecting the exterior of the vehicle, refueling, or sitting in a nearby building).

In use, each wireless link 114a-114c transmits information between the respective electronic onboard recorder unit 106a-106c and its corresponding mobile communication device 112a-112c. In some implementations, the electronic onboard recorder units 106a-106c do not provide their own user interfaces (e.g., displays, input buttons), but instead wirelessly communicate bi-directionally with the mobile communication devices 112a-112c to provide user interface functions for the overall mobile system 110a (refer, for example, to FIG. 2). For example, the electronic onboard recorder unit 106a may wirelessly communicate vehicle usage information so that the mobile communication device 112a can calculate and display hours of service information on the display screen carried by the driver. In another example, the electronic onboard recorder unit 106a may determine the location of the vehicle 102a and wirelessly communicate the location information to the mobile communication device 112a so that the mobile communication device 112a can display the location on a map. Example uses of the mobile communication devices 112a-112c as user interfaces for the electronic onboard recorder units 106a-106c are discussed further in the descriptions of FIGS. 2-5.

In use, the mobile communication devices 112a-112c may communicate with at least one transceiver 122 over a collection of wireless links 120a-120c. In some implementations, the wireless links 120a-120c can be long-range wireless links, such as cellular communication links, satellite communication links, WiMAX links, long term evolution (LTE) links, or any other suitable form of long-range wireless link that can communicate data between the mobile communication devices 112a-112c and the transceiver 122. In this particular embodiment, the transceiver 122 may be in the form a cellular antenna tower that is configured to provide cellular data links to a variety of cellular telephones within a particular geographic range. The transceiver 122 may be communicatively connected to a base station 124. In some implementations, the base station 122 can be a cellular data communications provider, satellite communications provider, or any other appropriate wireless communications provider. Still referring to FIG. 1, a network 130 communicatively connects the base station 124 with the control center 104. In some embodiments, the network 130 may include the Internet or other public or private data networks. In alternative embodiments in which one or more of mobile communication devices 112a-112c comprise a satellite phone, at least one of the long-range wireless links 120a-120c can be a satellite communication link and the transceiver 122 may be in the form a satellite communication apparatus.

A mentioned previously, the control center 104 exchanges information with the electronic onboard recorder units 106a-106c (via the mobile communication devices 112a-112c) to monitor the status of the vehicles 102a-102c. For example, the control center 104 may track the locations of the vehicles 102a-102c in order to estimate delivery or pickup times, or to coordinate the dispatch of the vehicles 102a-102c to pick up a delivery (e.g., by dispatching the vehicle 102a-102c closest to the pickup location). In another example, the control center 104 may monitor the vehicles" 102a-102c operating parameters to coordinate repairs or maintenance (e.g., monitor temperatures of refrigerated cargo, monitor engine warning signals).

Another form of information generated by the system for communication to the control center 4 are driver duty logs, which may include data indicative of the hours of service when the driver is on duty in a particular day. In some implementations, the driver duty logs can be automatically converted into electronic record of duty files (including hours of service records, driver identification information, etc.) that are readily exportable via the USB port of the electronic onboard recorder units 106a-106c (FIG. 3) or via the wireless link 120a-c of the mobile communication devices 112a-112c (FIG. 2).

For example, the electronic onboard recorder unit 106a can collect the vehicle usage information over a period of time when a particular driver is using the vehicle 102a, and the electronic onboard recorder unit 106a can periodically transfer this vehicle usage information to the corresponding mobile communication device 112a linked thereto via the Bluetooth connection 114a. The mobile communication device 112a can access the vehicle usage information along with other driver-specific information (e.g., driver identification information and the like) so as to generate the electronic record of duty file stored on the memory of the mobile communication device 112a. From there, the electronic record of duty file can be wirelessly communicated via the cellular link 120a to the control center 104, wirelessly communicated via the Bluetooth link 114a to the electronic onboard recorder unit 106a for subsequent exporting via the USB port to a remote device (refer to FIG. 3), or both. Regarding the process for exporting via the USB port, the electronic onboard recorder unit 106a can be configured to output the electronic record of duty file directly to a temporarily connected external computer device 150 (e.g., a notebook computer) or a portable storage device 152 (e.g., a USB thumb drive, a portable hard drive) provided by a vehicle inspector 154 (e.g., a law enforcement official, a regulatory inspector, or the like), In such circumstances, the vehicle inspector 154 can conveniently plug the external computer device 150 or the portable storage device 152 into the USB port provided by the electronic onboard recorder unit 106a to facilitate a transfer of the requested data from the electronic onboard recorder unit 106a, Thus, the electronic onboard recorder unit 106a and the mobile communication device 112 are two separately housed instruments that act together as a system to generate and communicate the electronic record of duty file associated with the driver.

Figure 2:
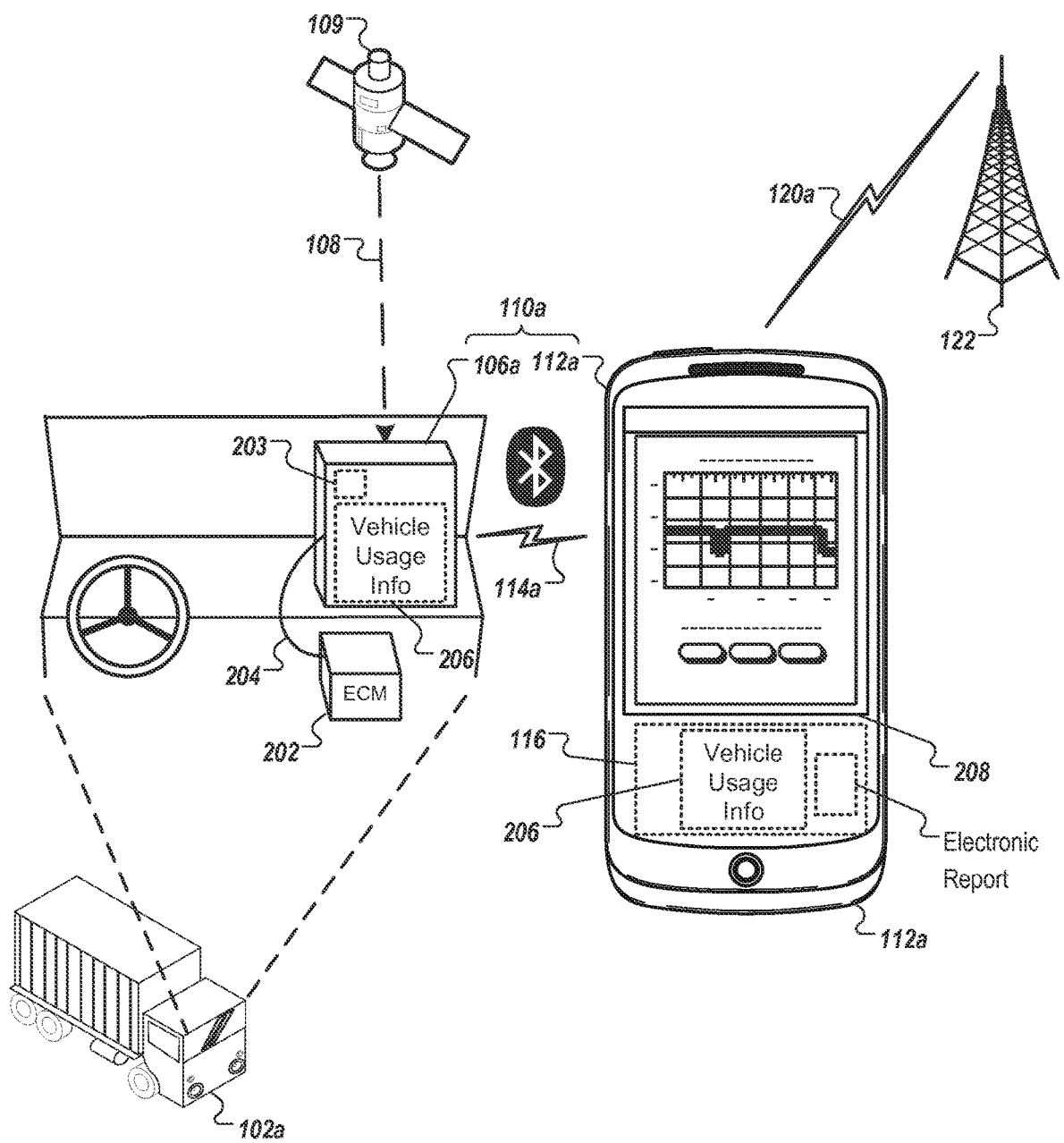
FIG. 2 is a diagram that shows an example of a system for communicating fleet vehicle information, In accordance with some embodiments.

Referring now to FIG. 2, in some embodiments of the system 110a for communicating fleet vehicle information, the electronic onboard recorder unit 106a is mounted in the vehicle 102a so that the electronic onboard recorder unit 106a is electrically connected to the vehicle 102a. In particular, the electronic onboard recorder unit 106a can include as input cable (e.g., data bus 204) that electrically connects to a mating connector of an engine control module (ECM) 202 of the vehicle 102a. In some implementations, the ECM 202 is an electronic device that monitors and/or controls various functions of the vehicle 102a. For example, the ECM 202 can monitor vehicle speed, engine speed, coolant temperature, vehicle mileage, cargo environmental parameters, and any other appropriate vehicle parameters. In this embodiment, the electronic onboard recorder unit 106a is configured to mount directly to a dash component inside the cabin of the vehicle 102a. As previously described, the electronic onboard recorder unit 106a can be a displayless unit that is without any user interface display screen, thereby reducing the size of the unit 106a and facilitating a simplified installation process. The user interface 208 of the mobile communication device 112a can be used as a portable user interface for the electronic onboard recorder unit 106a when the unit 106a communicates with the mobile communication device 112a over the Bluetooth connection 114a. Moreover, in some implementations, the electronic onboard recorder unit 106a may include a single printed circuit board upon which all of its electronic circuitry is mounted, thereby further reducing the size and manufacturing complexities of the unit 106a. It should be understood from the description herein that the electronic onboard recorder unit 106a is depicted as an enlarged size in FIGS. 2-33 for purposes of illustration only, and that the actual size of the electronic onboard recorder unit 106a may be significantly smaller. For example, in some embodiments, the electronic onboard recorder unit 106a has a maximum length of about 8 inches, a maximum width of about 6.5 inches, and a maximum height of about 1.5 inches.

In some implementations, the electronic onboard recorder unit 106a can detect the particular type of communications protocol employed by the ECM 202, and automatically adapt to the detected protocol in order to communicate with the ECM 202. In these circumstances, the electronic onboard recorder 106a can be installed in any one of a number of different types of vehicles (e.g., a class 8 large truck, a class 1 car, or the lice), and the installer's act of connecting the cable 204 to the vehicle's ECM 202 will prompt the control circuitry of the electronic onboard recorder unit 106a to automatically recognize the type of vehicle in which it is installed. As such, some embodiments of the electronic onboard recorder unit 106a need not be manufactured or preprogrammed in a vehicle-specific manner. For example, in some implementations, the ECM 202 can implement a controller area network (CAN), a local interconnect network (LIN), a vehicle area network (VAN), FlexRay, J1939, ISO-1 1783, domestic digital bus (D2B IDB-1394, SmartWireX, MOST, J1850, ISO-9141, J1708, J1587, SPI, HC, or any other communications protocol for communicating with the electronic onboard recorder unit 106a through the data bus 204. In such circumstances, the electronic onboard recorder unit 106a may detect the combination and/or signal levels implemented over the data bus 204, may analyze incoming data traffic, and/or may query the ECM 202 using various protocols and receive corresponding responses in order to determine the protocol in use by the ECM 202. In some implementations, the connector on the end of the data bus cable 204 (e.g., the end which connects to the ECM 202) can include a connection jack having more data lines than are provided by the ECM 202. Multiple converters may be provided to adapt a subset of the port's data lines to a variety of configurations of the data bus 204. For example, passenger cars and other "class 1" vehicles may provide a connector that is compliant with the on-board diagnostic (OBD) II specification, while large trucks and other "class 8" vehicles may provide a connector that is compliant with the heavy-duty OBD (HDOBD) specification. In such examples, one converter may be provided to adapt the port to connect to OBDII data buses, and another may be provided to adapt the port to connect to HDOBD data buses. The electronic onboard recorder unit 106a may sense the configuration of an attached converter to determine the appropriate protocol to use for communication with the ECM 202.

In some embodiments, the electronic onboard recorder unit 106a can be configured to simultaneously communicate via multiple protocols at once. For instance, the electronic onboard recorder unit 106a can be configured to communicate via the J1939 and J1708 protocols at the same time. This feature can be useful, for example, for a vehicle in which the ECM 202 communicates in two different protocols (e.g., communicates some information (braking information) on one engine bus and other information (e.g., fuel information) on another engine bus. Also, this feature can be useful when a single vehicle includes multiple ECMs 202 that employed different protocols. Thus, the electronic onboard recorder unit 106a can to gather some vehicle information appears on one engine bus, and to gather other vehicle information on another engine bus. In one implementation, the cable 204 can have a first set of wires that are configured to connect with a first ECM (or a first engine bus of an individual ECM) while a second set of wires are configured to mate with a second ECM (or a second engine bus of the individual ECM).

Furthermore, in particular embodiments in which the ECM 202 or engine bus 204 may not provide a direct odometer reading, the electronic onboard recorder unit 106a can be configured to interpret other engine parameters to create an effective odometer reading of the vehicle 102a starting at the point when the electronic onboard recorder unit 106a was installed in the vehicle 102a. For example, the electronic onboard recorder unit 106a can receive data indicative of vehicle speed (e.g., used in combination with an internal clock or timer of the electronic onboard recorder unit 106a) or data indicative of distance increments (e.g., distance pulses every 0.1 miles) so as to generate "effective odometer reading" for the vehicle 102a. Accordingly, the system 110a can be used to comply with distance and odometer reporting requirements (via an electronic report) even if the ECM 202 or engine bus 204 of the vehicle 102a does not directly provide odometer readings. In addition, the system 110a can prompt an installer or other user to manually Input the vehicle odometer reading (as shown on the dash of the vehicle) when the electronic onboard recorder unit 106a is initially installed so that the "effective odometer reading calculated by the system 110 is a substantially accurate estimation of the actual total mileage of the vehicle 102a.

As described previously, the electronic onboard recorder unit 106a receives location information in the form of global positioning system (GPS) signals 108 from at least one GPS satellite 109 to determine the location of the vehicle 102a. For example, the electronic onboard recorder unit 106a can be equipped with a GPS receiver device that receives signals from the GPS satellite 109 so that the electronic onboard recorder unit 106a can receive coordinate information (e.g., longitude and latitude coordinates) and time information (e.g., current time). In addition, in some embodiments, the electronic onboard recorder unit 106a can be equipped with one or more accelerometers 203 so as to detect particular types of vehicle movement, such as hard brakes, acceleration, and lane changes. Instances of this type of vehicle movement can be recorded by the electronic onboard recorder unit 106a can communicated to the control center 104 (via the mobile communication device 112a) for purposes of safety monitoring by a fleet manager or other system user. Thus, during operation of the vehicle, some embodiments of the electronic onboard recorder unit 106a can receive input information from a combination of the ECM 202 of the vehicle 102a, the GPS system, and the one or more internal accelerometers 203.

Still referring to FIG. 2, the electronic onboard recorder unit 106a collects information from the various inputs (e.g., the ECM 202, the GPS system, and the one or more accelerometers 203) and stores the vehicle usage information as data in a computer-readable memory module 206. As previously described, in this embodiment, the electronic onboard recorder unit 106a is displayless and thus has no user interface of its own with which to let a user view or interact with the vehicle usage information. Rather, in this embodiment, the electronic onboard recorder unit 106a communicates the vehicle usage information from the memory module 206 to the mobile communication device 112a over the Bluetooth connection 114a, and the vehicle usage information can be stored in a computer-readable memory module 116 of the mobile communication device 112a. The mobile communications device 112a provides a user interface 208 with which the user can access some or all the vehicle usage information. Examples of user interfaces are discussed in further detail in the descriptions of FIGS. 4A and 4B.

In addition to displaying some or all of the vehicle usage information on the mobile communication device 112a, the vehicle usage information may also be transmitted to the control center 104 for review and archly ng. For example, in this embodiment, the mobile communication device 112a can communicate with the transceiver 122 over the cellular link 120a so as to wirelessly communicate the vehicle usage information and other electronic reports, messages, or data to the control center 104. As such, the electronic onboard recorder unit 106a and the mobile communication device 112a operate as a system 110a that is positionable inside the vehicle 102a and that communicates information related to the vehicle and its driver. Moreover, at least the display portion (e.g., the mobile communication device 112a) of the system 110a can be portable relative to the electronic onboard recorder unit 106a and the vehicle 102a, thereby permitting the user to view and input vehicle or driver-related information even when the user is positioned outside the vehicle. Further, because each mobile communication device 112a-c is portable relative to the vehicles 102a-c (FIG. 1) and the electronic onboard recorder units 106a-c (FIG. 1), each mobile communication device 112a-c can be configured to wirelessly communicate with any one of the nearby electronic onboard recorder units 106a-c. For example, if the driver carrying the mobile communication device 112a switches to vehicle 102b (FIG. 1) for a new workday, the driver's mobile communication device 112a can be configured to wirelessly communicate with the electronic onboard recorder unit 106b (FIG. 1) mounted inside that vehicle 102b for the workday.

Figure 3:
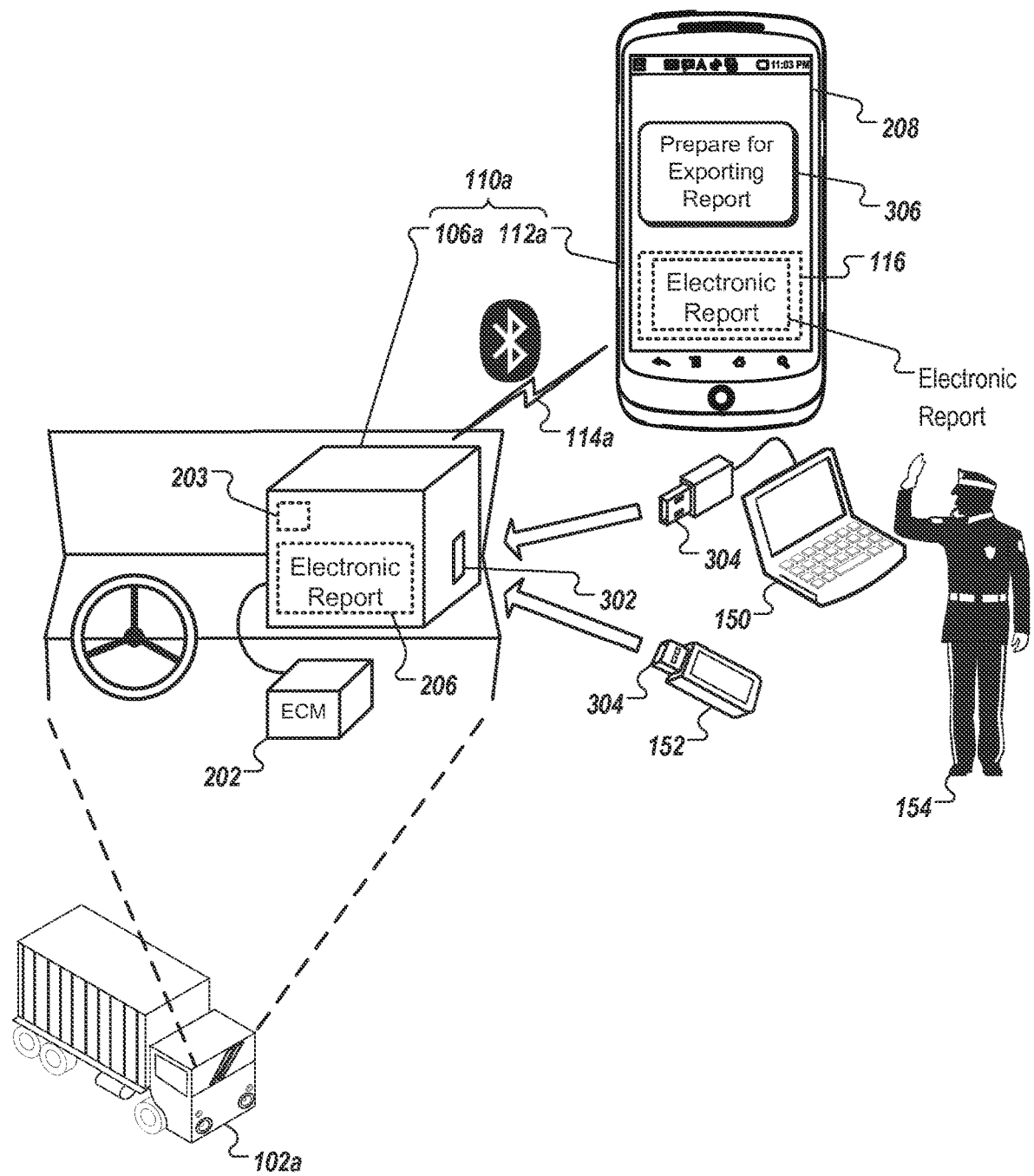
FIG. 3 is a diagram that shows the system of FIG. 2 in combination with at least one external storage device, in accordance with some embodiments.

Referring now to FIG. 3, each of electronic onboard recorder units 106a-c can be equipped with an external data port (e.g., a USB port in this embodiment) for exporting electronic reports or other data to a temporarily connected external storage device, such as the portable computer device 150, the portable storage device 152, or the like. As described previously, the electronic onboard recorder unit 106a includes the memory module 206 for the vehicle usage information and other data, and the mobile communication device 112a can receive the vehicle usage information and generate electronic reports (such as an electronic record of duty file). In some implementations, the electronic record of duty file stored in the memory module 116 of the mobile communication device 112a may be copied to the electronic onboard recorder unit 106a (e.g., via the wireless link 114a) for subsequent access by a third party such as the vehicle inspector 154. For example, under some jurisdictions law enforcement or regulatory inspectors may be authorized to request a copy of the data 206 in order to inspect the driver's record of duty to determine whether the driver is in compliance with laws that regulate the number of consecutive or cumulative hours the driver is permitted to be on duty in a given period. Thus, in some circumstances, the electronic record of duty file can be generated by and stored in the mobile communication device 112a, and this electronic report can be wirelessly communicated to the electronic onboard recorder unit 106a prior to exporting the electronic record of duty file via the output data port 302 of the electronic onboard recorder unit 106a. hi some embodiments in which a copy of the electronic record of duty file is stored in both the mobile communication device 112a and the electronic onboard recorder unit 106a, and the copies of these files can be updated or sync prior to exporting the electronic record of duty file via the output data port 302 of the electronic onboard recorder unit 106a.

In the illustrated example, the vehicle inspector 154 can request that a copy of the data 206 be copied to the inspector's computer device 150 or the inspector's portable storage device 152. To facilitate communication between the electronic onboard recorder unit 106a and the computer device 150 of the portable storage device 152, the computer device 150 or the portable storage device 152 can be plugged into the data output port 302 of the electronic onboard recorder unit 106a. As previously described, the data output port 302 may be a USB port adapted to accept a USB connector 304 provided by any of the computer device 150 and the portable storage device 152.

Still referring to FIG. 3, in some embodiments, the mobile communication device 112a can control the transfer of the electronic record of duty file or other data from the electronic onboard recorder unit 106a to the inspector's computer device 150 or the inspector's portable storage device 152. For example, the electronic record of duty file or other data stored on the electronic onboard recorder unit 106a may be protected from exporting via the data port 302 until the user provides approval for the data transfer via the user interface 208 of the mobile communication device 112a. In such circumstances, the data stored on the electronic onboard recorder unit 106a may be protected from unauthorized users, and furthermore, the data files stored on the electronic onboard recorder unit 106a may be updated or synced with the data files stored on the mobile communication device 112a prior to any file exporting operation via the data port 302. In this embodiment, the mobile communication device 112a presents the user interface 208 that prompts the user to initiate the file transfer process from the electronic onboard recorder unit 106a to the inspector's computer device 150 or the inspector's portable storage device 152. The user interface 208 of the mobile communication device 112a can provide, for example, at least one control button 306 that receives the user input indicative of a command to initiate the file transfer process. in some implementations, the user control button 306 can be a physical button, a touchscreen button, a selectable menu item, or any other user control mechanism on the mobile communication device 112a. In other implementations, the control button 306 can be replacement with an input to detect a user gesture, a spoken command (e.g., speech recognition), or any other appropriate user action that the mobile communication device 112a can detect as a user command.

In response to activation of the user control button 306, the system 110a initiates a process in which the electronic record of duty file or other data file is at least partially transferred to the electronic onboard recorder unit 106a for purposes of storing a copy of the file at the electronic onboard recorder unit 106a or otherwise updating an older version of the file stored at the electronic onboard recorder unit 106a. After the current version of the electronic record of duty file or other data file is stored at both the mobile communication device 112a and the electronic onboard recorder unit 106a, the electronic record of duty file or other data file can be exported via the data port 302 of the electronic record of duty file or other data file. The operation for transferring the electronic record of duty file or other data file to the computer device 150 or to the portable storage device 152 can be an automatic process that requires no further user input on the mobile communication device 112a and the electronic onboard recorder unit 106a. For example, after the initial user input on the control button 306 of the user interface 208, the electronic record of duty file or other data file will be automatically transferred via the data port 302 upon a proper connection with the computer device 150 or to the portable storage device 152. As such, the driver or the inspector 154 can plug the inspector's device 150 or 152 into the communication port 302 either before or after the driver activates the user control button 306, in which case a copy of the electronic record of duty file from the electronic onboard recorder unit 106a is transferred via the data port 302 to the inspector's device 150 or 152. When finished, the inspector's device 150 or 152, with the electronic record of duty file or other data file stored in the memory thereof, can then be disconnected from the communications port 302 and used by the vehicle inspector 154.

Figure 4A:
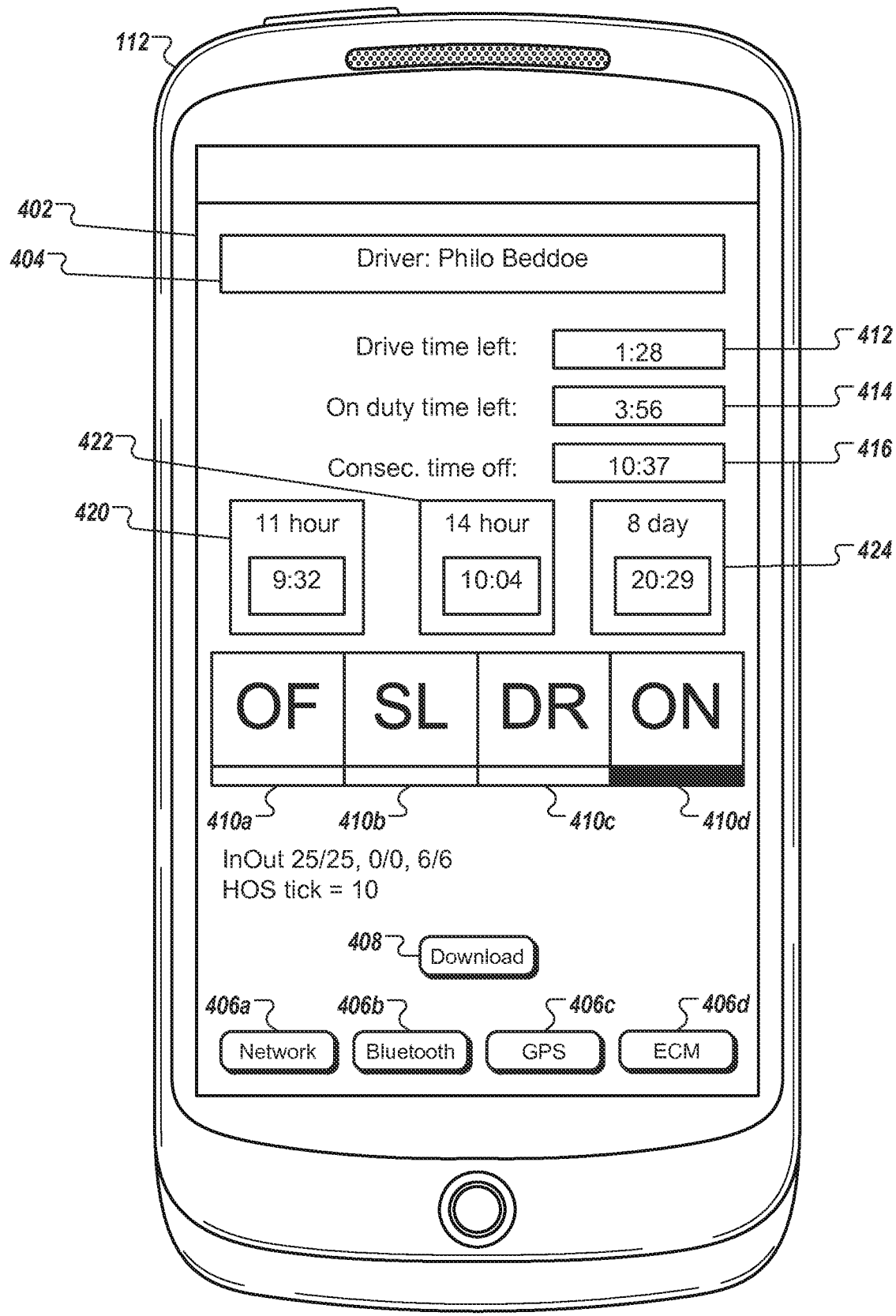
FIGS. 4A-4B illustrate examples of a user interface for a mobile communication device of a system for communicating fleet vehicle information, in accordance with some embodiments.
Figure 4B:
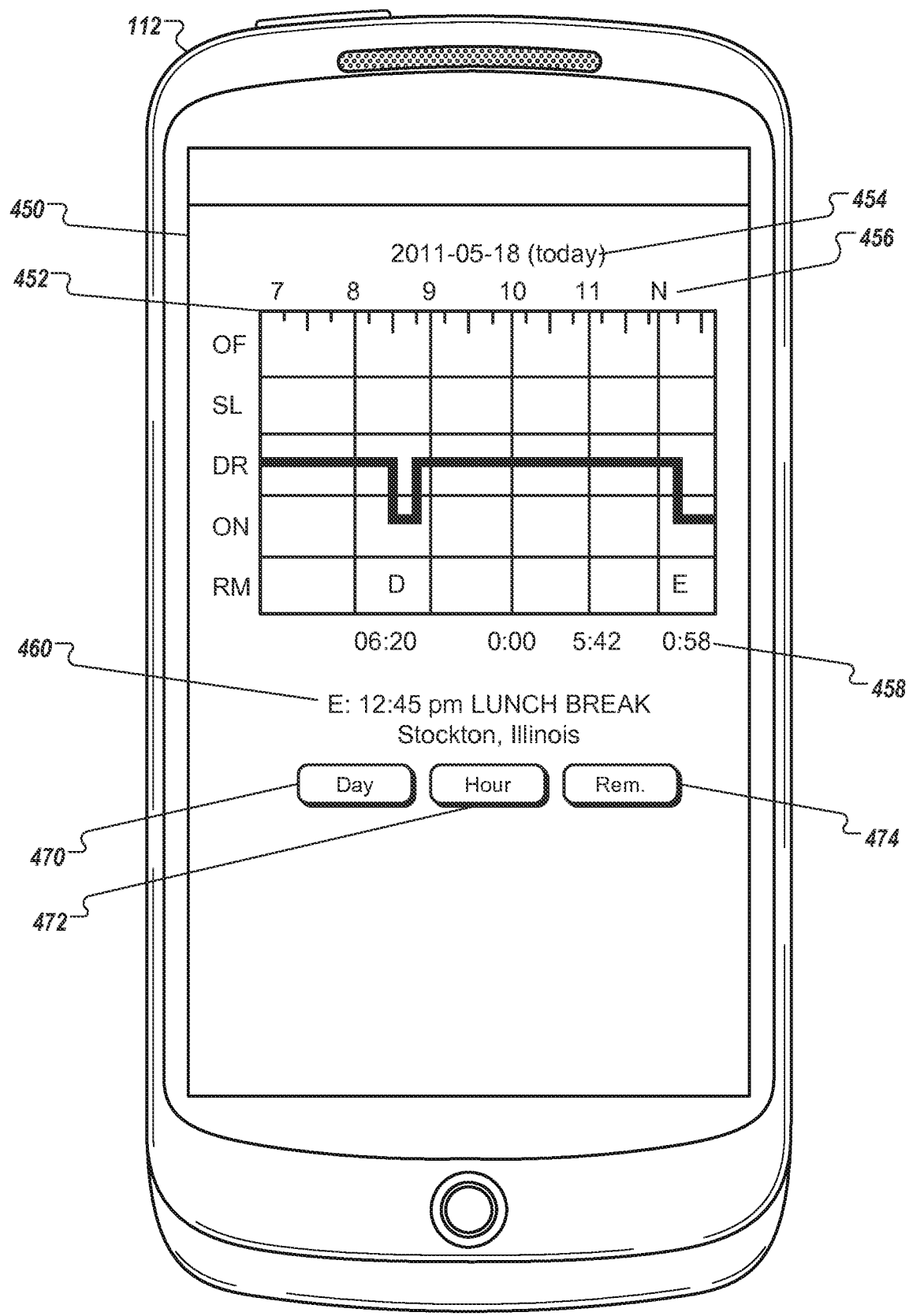

Referring now to FIGS. 4A-B, the mobile communication device 112 can provide the user interface for the electronic onboard recorder unit 106 (FIGS. 2-3) and can be configured to display a variety of vehicle and driver-related information in response to wirelessly receiving vehicle usage information from the electronic onboard recorder unit 106. For example, as shown in FIG. 4A, the mobile communication device 112 that presents an example user interface screen 402 that summarizes the driver duty information for display during operation of the vehicle. In some implementations, the mobile communication device 112 can be any one of the mobile communication devices 112a-112c depicted in FIG. 1, and the user interface screen 402 can be accessed from a menu selection on the user interface 208 as depicted in FIGS. 2-3.

In this embodiment, the user interface 402 includes a driver name display area 404 which displays the name of the driver or other identification information associated with driver. Such driver identification information can be input into the mobile communication device 112 or selected from a list displayed by the mobile communication device 112, and the driver identification information can be used in generating the aforementioned electronic record of duty file.

Still referring to FIG. 4A, a collection of status indicators 406a-406d provides visual indications of several operational parameters of the mobile communication device 112 and/or an associated electronic onboard recorder unit (e.g., the electronic onboard recorder units 106a-106c). For example, the status indicator 406a can display a visual indication of whether the mobile communication device 112 is connected to the transceiver 122 of FIG. 1 by one of the communication links 120a-120c. The status indicator 406b can display a visual indication of whether the mobile communication device 112 is connected to its associated electronic onboard recorder unit 106a-c by one of the Bluetooth connections 114a-114c. The status indicator 406c can display a visual indication of whether the mobile communication device 112 is receiving the GPS signals 108 form the GPS satellites 110. The status indicator 406d can display a visual indication of whether the mobile communication device 112 is connected to an associated ECM, such when the electronic onboard recorder unit 106a is connected to the ECM 206 of FIG. 2 by the data bus 204.

In some embodiments, a download button 408 is provided by the user interface 402 to accept user input indicative of a command to initiate a transfer of data from the associated electronic onboard recorder 106 (FIG. 3) unit to an external storage device, such as the computer device 150 or the portable storage device 152 as described previously discussed in the description of FIG. 3. Accordingly, the download button 408 can initiate a set of operations in which particular data files stored on the mobile communication device 112 are copied to the electronic onboard recorder 106 or otherwise used to update with similar files previously stored on electronic onboard recorder 106. From there, the one or more data files can be exported via the data port 302 as previously described in connection with FIG. 3, As such, the download button 408 may operate similarly to the previously described control button 306 (FIG. 3).

In addition, the user interface 402 provides a number of inputs for the driver to alter his or her duty status, thereby affecting the driver's hours of service and the aforementioned electronic record of duty file. For example, the driver may interact with a user control 410a to indicate that he or she is in an "off duty" status. The driver can interact with a user control 410b to indicate that he or she is in a "sleeper berth" status (e.g., the driver is resting in a sleeper unit associated with his vehicle). The driver can interact with a user control 410c to indicate that he or she is operating his vehicle. The driver can interact with a user control 410d to indicate that he or she is in an on duty" status even when he or she is not driving the vehicle (e.g., inspecting the vehicle or performing other on-duty tasks). In some implementations, the user controls 410a-410d can change their visual appearance to indicate the status currently selected by the driver. For example, the user control 410a may be displayed with a brighter color than the user controls 410b-410d when the driver is in an "off duty" status.

Still referring to HG. 4A, the interface 402 of the mobile communication device 112 can also display indicators related to the driver's hours of service. For example, an indicator 412 displays the amount of time the driver has left before he or she is in violation of a predetermined drive time limit, An indicator 414 displays the amount of time the driver has left before he or she is in violation of a predetermined on duly time limit. An indicator 416 displays the consecutive amount of time the driver has been off duty.

Furthermore, an indicator 420 displays the amount of drive time the driver has accrued in a given day, which (in this embodiment) has an upper limit of "11 hours" of total drive time before he or she is in violation of a predetermined drive time limit. Thus, the time values in indicators 412 and 420 will add up to the maximum drive time limit ("11 hours" in this embodiment). When the driver's total drive time in indicator 420 exceeds the upper limit, the indicator may change colors, for example, to a red color to warn the driver of the violation. Optionally, an indicator 422 displays the amount of on-duty time the driver has accrued in a given day, which (in this embodiment) has an upper limit of "14 hours" of total on-duty time before he or she is in violation of a predetermined on-duty time limit. Thus, the time values in indicators 422 and 414 will add up to the maximum on-duty time limit ("14 hours" in this embodiment). When the driver's total drive time in indicator 422 exceeds the upper limit, the indicator may change colors, for example, to a red color to warn the driver of the violation. Further, an indicator 424 displays the amount of total on-duty time the driver has accrued in a period of consecutive days (e.g., "8 days" in this embodiments). For example, the total on-duty time the driver has accrued in an eight-day period may have an upper limit of "70 hours" in this embodiment. When the driver's total drive time in indicator 424 exceeds the upper limit, the indicator may change colors, for example, to a red color to warn the driver of the violation.

As shown in FIG. 4B, the mobile communication device 112 can provide another user interface screen 450 that depicts a summary of the driver's duty log. In some embodiments, the summary information provided in this user interface screen 450 can be employed in the electronic record of duty file that is generated by the mobile communication device 112 for purposes of sharing with the aforementioned inspector 154 (FIG. 3). In some implementations, the user interface screen 450 can be accessed from a menu selection on the user interface 208 as depicted in FIGS. 2-3.

The user interface 450 in this embodiment includes an electronic duty log in the form of a time chart 452. The chart 452 provides a convenient visualization of the driver's status (e.g., on duty, off duty, driving, sleeper berth) over a selected period of time. A date indicator area 454 displays the date associated with the information presented by the chart 452. A time indicator area 456 displays the times associated with the information presented by the chart 452. A time interval area 458 displays the elapsed time durations associated with the various statuses presented by the chart 452.

A status area 460 displays the driver's current status or the status presented by the chart 452. In some implementations, the status area 460 can include time information, status information, location information, a remark, and (optionally) the driver's name or other identification information. In some implementations, the remark can be selected from a collection of predefined remarks (e.g., "fueling", "breakdown", "loading", "unloading"). In some implementations, the remark can be entered by the driver. For example, the driver may need to enter a remark that is not described by a predefined remark (e.g., "helping a motorist").

The driver can interact with a user control 470 to cause the chart 452 to display the duty status over a period of one day or other predetermined time interval of data on the chart 452. The driver can interact with a user control 472 to cause the chart 452 to display a one hour or other predetermined time interval of data on the chart 452. The driver can interact with a user control 474 to cause the user interface 450 to present additional user controls that the driver can use to enter remark information that can be associated with one or more of the driver's statuses.

Figure 5:
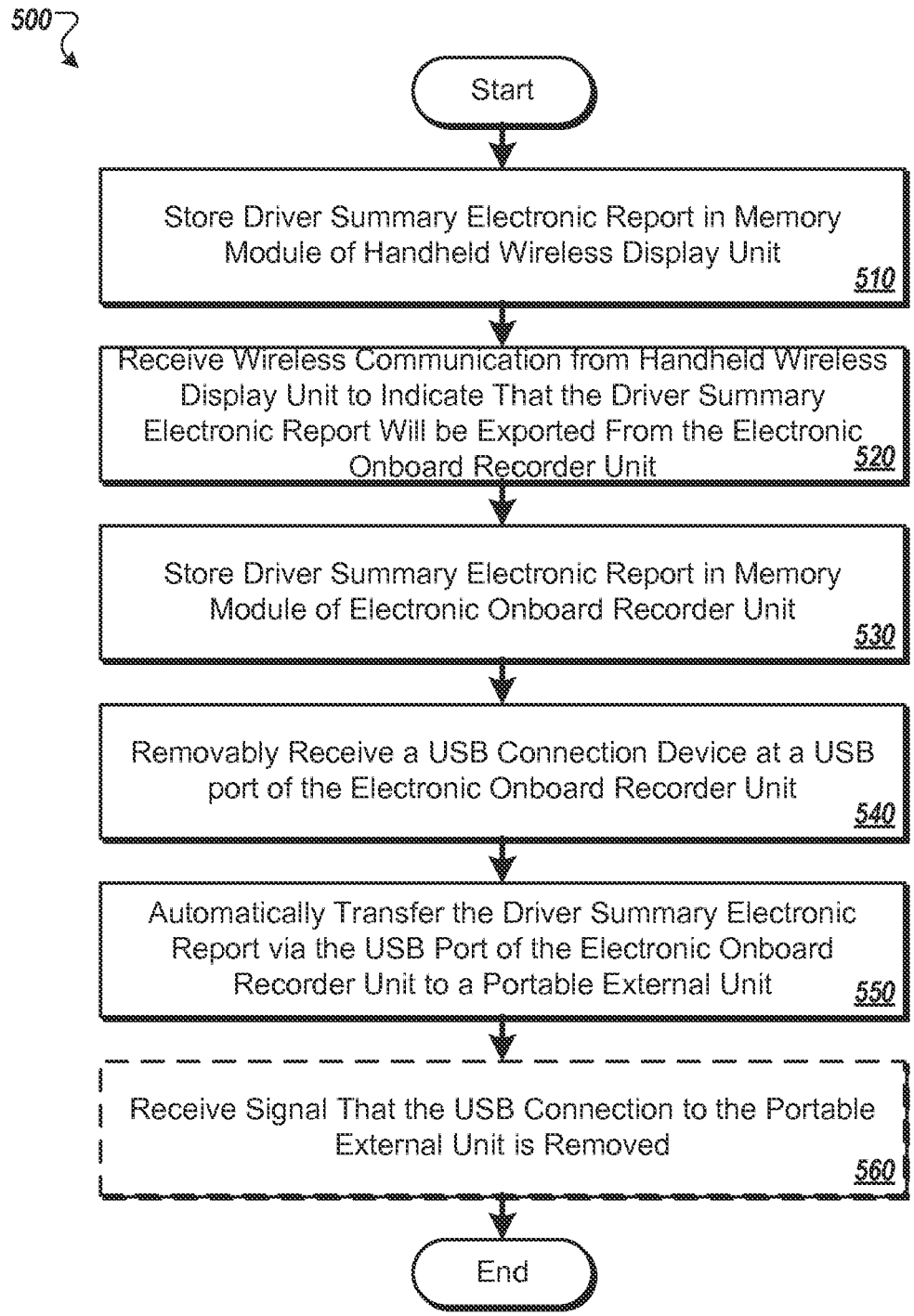
FIG. 5 is flow chart that shows an example process for communicating an electronic report or other data from an electronic onboard recorder unit to an external storage device, in accordance with some embodiments.

Referring now to FIG. 5, some embodiments for a process 500 can be performed to transferring an electronic report from an electronic onboard recorder unit (such as unit 106a depicted in FIG. 3) to an external computer or storage device (such as the inspector's device 150 or 152 depicted in FIG. 3). The process 500 may include an operation 510 in which a driver summary electronic report (e.g., an electronic record of duty file) in memory module of a handheld wireless display unit (e.g., the mobile communication device 112a depicted in FIG. 3). For example, the electronic onboard recorder unit 106a can collect the vehicle usage information over a period of time when a particular driver is using the vehicle 102a, and the electronic onboard recorder unit 106a can periodically transfer this vehicle usage information to the corresponding mobile communication device 112a linked thereto via the Bluetooth connection 114a. The mobile communication device 112a can access the vehicle usage information along with other driver-specific information (e.g., driver identification information and the like) so as to generate the electronic record of duty file for storing on the memory of the mobile communication device 112a.

The process 500 may also include an operation 520 in which a wireless communication from the handheld wireless display unit (e.g., the mobile communication device 112a in this embodiment) is received to indicate that the driver summary electronic report (e.g., the electronic record of duty file in this embodiment) is approved for exporting from the electronic onboard recorder unit. For example, the driver can activate the user control button 306 as depicted FIG. 3 so that the mobile communication device 112a can prepare the electronic onboard recorder unit 106a for exporting the driver summary electronic report (e.g., the electronic record of duty file in this embodiment).

At operation 530 in the process 500, the driver summary electronic report is also stored in a memory module of an electronic onboard recorder unit, which is wirelessly linked to the handheld wireless display unit. For example, the driver summary electronic report (e.g., the electronic record of duty file in this embodiment) can be wirelessly communicated via the Bluetooth link 114a from the mobile communication device 112a to the electronic onboard recorder unit 106a. This operation 530 may be performed in response to operation 520. It should be understood from the description herein that the process 500 can be achieved by performing operation 530 either before or after the operation 520. If operation 530 is performed before operation 520, then operation 520 may cause the mobile communication device 112a to update the driver summary electronic report (e.g., the electronic record of duty file in this embodiment) stored on the electronic onboard recorder unit 106a with a more recent version of the file.

At operation 540, the electronic onboard recorder unit removably receives a USB connection device at a USB port arranged along the housing of the electronic onboard recorder unit. For example, as previously described in connection with FIG. 3, the electronic onboard recorder unit 106a can be equipped with a USB port 302 that is configured to removably receive the USB connector 304 from an inspector's portable computer 150 or portable storage device 152. In such circumstances, the vehicle inspector 154 can conveniently plug the external computer device 150 or the portable storage device 152 into the USB port 302 provided by the electronic onboard recorder unit 106a to facilitate a transfer of the requested data from the electronic onboard recorder unit 106a.

The process 500 may also include operation 550 in which the driver summary electronic report (e.g., the electronic record of duty file in this embodiment) is automatically transferred to via the USB port of the electronic onboard recorder unit to a portable external unit. For example, in response to the user input at operation 520 and the receipt of the USB connection device at operation 540, the electronic record of duty file may automatically transferred via the USB port 302 the inspectors device 150 or device 152 without any further user input at the electronic onboard recorder unit 106a or its corresponding mobile communication device 112a. As such, the electronic onboard recorder unit 106a can be configured to output the electronic record of duty file directly to a temporarily connected external computer device 150 (e.g., a notebook computer) or a portable storage device 152 (e.g., a USB thumb drive, a portable hard drive) provided by a vehicle inspector 154 (e.g., a law enforcement official, a regulatory inspector, or the like).

The process 500 may optionally include operation 560 in which a signal is automatically received by the electronic onboard recorder unit indicating that the USB connection to the portable external unit is removed. For example, the USB connection device 304 (FIG. 3) can be removed from the electronic onboard recorder unit 106a. When a USB device (sometimes referred to as a slave) is connected to or disconnected from a USB host (e.g., the electronic onboard recorder unit 106a in this embodiment), there is a change on these USB data lines. It is this change that the USB host can use to automatically detect that a device has been connected or removed.

Figure 6:
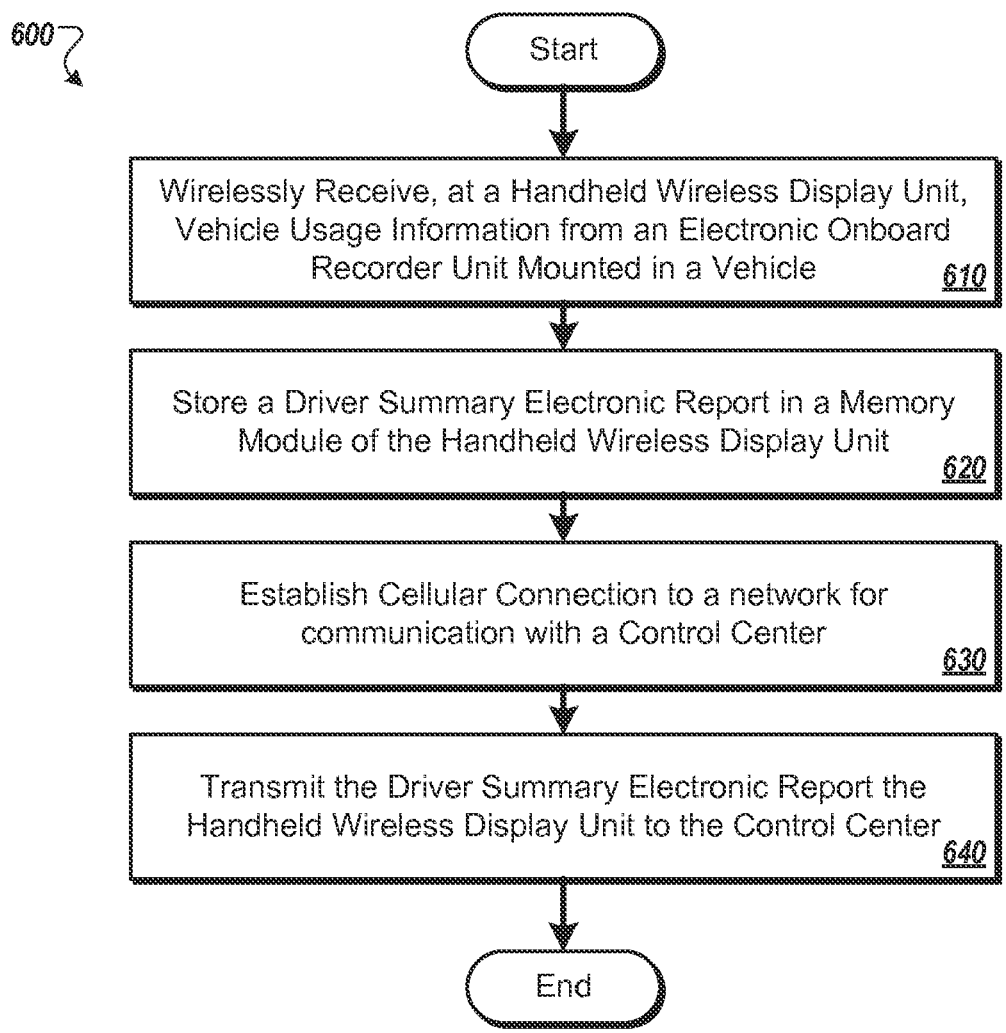
FIG. 6 is flow chart that shows an example process for using a mobile communication device to transmit an electronic report or other data to a fleet management control center.

Referring now to FIG. 6, some embodiments of a process 600 can be performed to communicate a driver summary electronic report via a cellular link established by a handheld wireless display unit (e.g., the mobile communication device 112a depicted in FIG. 3). The process 600 may include an operation 610 in which vehicle usage information is wirelessly received at the handheld wireless display unit from an electronic onboard recorder unit mounted in a vehicle. For example, the electronic onboard recorder unit 106a can collect the vehicle usage information over a period of time when a particular driver is using the vehicle 102a, and the electronic onboard recorder unit 106a can periodically transfer this vehicle usage information to the corresponding mobile communication device 112a linked thereto via the Bluetooth connection 114a.

In operation 620, a driver summary electronic report (e.g., the electronic record of duty file in this embodiment) is stored in a memory module of a handheld wireless display unit, which is in wireless communication with the electronic onboard recorder unit. For example, the mobile communication device 112a can access the vehicle usage information along with other driver-specific information (e.g., driver identification information and the like) so as to generate the electronic record of duty file for storing on the memory of the mobile communication device 112a.

The process may also include operation 630 in which a cellular connection is established to a network for communication between the handheld wireless display unit and a control center. For example, the mobile communication device 112a can establish the wireless connection 120a with the transceiver 122, which is in communication with the control center 104 through the base station 124 and the network 130.

In operation step 640, the driver summary electronic report (e.g., the electronic record of duty file in this embodiment) is transmitted from handheld wireless display unit to the control center. For example, the electronic report and other data related to the driver or vehicle, which is stored on the mobile communication device 112a, can be communication via the cellular link 120a to the network 130 and to the control center 104 for review and archival purposes. Thus, in some embodiments, the electronic onboard recorder unit 106a and the corresponding mobile communication device 112a can each individually operate to output the driver summary electronic report.

Figure 7:
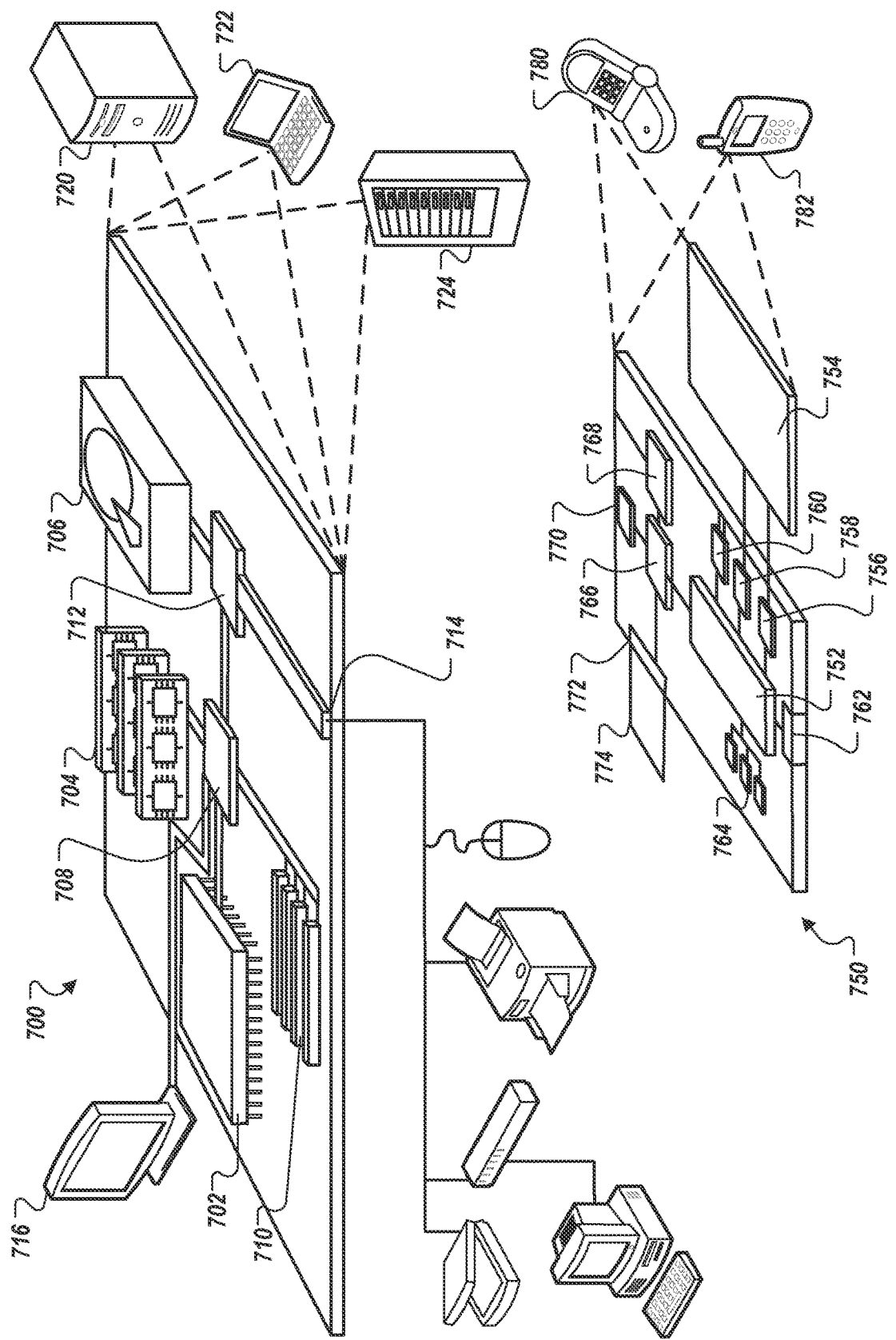
FIG. 7 is a diagram of computing devices that may be used to implement the systems and methods described herein, in accordance with some embodiments.

FIG. 7 is a block diagram of computing devices 700, 750 that may be used to implement the systems and methods described in this document, either as a client or as a server or plurality of servers. Computing device 700 is intended to represent various forms of digital computers, such as laptops, desktops, workstations, personal digital assistants, servers, blade servers, mainframes, and other appropriate computers, Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codes 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated Accordingly, other embodiments are within the scope of the following claims.

What is claimed is:

1. A fleet management system, comprising:
   (i) an electronic onboard recorder (EOR) that is mounted inside a vehicle and is electronically coupled with a diagnostic port of an engine control module (ECM) of the vehicle via an input cable which electronically couples with a mating connector of the ECM within the vehicle, wherein the EOR determines a communication protocol to use for communication with the ECM by detecting one or more of a configuration of the mating connector of the ECM or a configuration of a converter that is communicatively coupled with the input cable that couples with the ECM,
   wherein the EOR captures vehicle data associated the vehicle via the ECM and wirelessly communicates the vehicle data to a mobile communication device via a first short-range wireless communication component embedded within the EOR; and
   (ii) the mobile communication device that comprises:
      a user interface;
      a display;
      a second short-range wireless communication component;
      a long-range wireless communication component;
      a memory configured to store instructions;
      a processor communicatively coupled with the memory, the processor configured to execute the instructions to:
         input driver hours of service (HOS) information of a driver associated with the vehicle via the user interface;
         receive, at the second short-range wireless communication component, the vehicle data from the EOR via a short-range communication link, wherein the short-range communication link includes one or more of a Bluetooth, wireless Ethernet (WiFi), ZigBee, near-field communications (NFC), or infrared (IrDA);

store the vehicle data received from the EOR in the memory of the mobile communication device;

generate a driver summary electronic report by processing the vehicle data received from the EOR and the driver HOS information input;

present on the display of the mobile communication device at least one of:

the vehicle data, the driver HOS information, or the driver summary electronic report to a user via the display;

receive, via the user interface, a command to initiate a file transfer of a copy of the driver summary electronic report to an external device using the short-range communication link; and cause the file transfer of the copy of the driver summary electronic report to the external device in response to receiving the command to initiate the file transfer, wherein the cause the file transfer of the copy of the driver summary electronic report to the external device comprises:

transmitting, via the short-range communication link, the copy of the driver summary electronic report from the mobile communication device to the EOR; and transfer the copy of the driver summary electronic report from the EOR to the external device for inspection.

2. The fleet management system of claim 1, wherein the driver summary electronic report includes the driver HOS information.

3. The fleet management system of claim 1, wherein the processor is further configured to execute the instructions to:

alter one of the driver HOS information or the driver summary electronic report via the user interface of the mobile communication device that affects the driver HOS information.

4. The fleet management system of claim 1, wherein the EOR further comprises a global positioning system (GPS) receiver that receives signals from GPS satellites to determine a location of the vehicle.

5. The fleet management system of claim 1, wherein the EOR further comprises an accelerometer to detect one or more of a movement of the vehicle, acceleration, deceleration, braking, or lane changes of the vehicle, and store the detected information as the vehicle data in a memory of the EOR.

6. The fleet management system of claim 1, wherein the EOR further comprises a universal serial bus (USB) connection port in a housing of the EOR and configured to communicatively couple with a peripheral device.

7. The fleet management system of claim 1, further comprises:

the remote network device that receives one or more of the vehicle data, the driver HOS information, or the driver summary electronic report from the mobile communication device over the wireless network.

8. The fleet management system of claim 7, wherein the remote network device that receives one or more of the vehicle data, the driver HOS information, or the driver summary electronic report from the mobile communication device over the wireless network, is further configured to:

monitor at least one or more of location, speed, heading, or planned route of the vehicle based at least in part on receiving one or more of the vehicle data, the driver HOS information, or the driver summary electronic report from the mobile communication device over the wireless network; and display at least one or more of the location, the speed, the heading, or the planned route of the vehicle on a remote display device.

9. The fleet management system of claim 7, wherein the remote network device that receives one or more of the vehicle data, the driver HOS information, or the driver summary electronic report from the mobile communication device over the wireless network, is further configured to:

monitor at least one or more of duty status of the driver or the driver HOS information based on receiving one or more of the vehicle data, the driver HOS information, or the driver summary electronic report from the mobile communication device over the wireless network; and display at least one or more of the duty status of the driver or the driver HOS information on a remote display device.

10. The fleet management system of claim 9, wherein the remote network device is further configured to:

determine whether the at least one or more of the duty status of the driver or the driver HOS information exceeds an hours of service requirement threshold;

generate an HOS violation notification for the driver; and display the HOS violation notification on the remote display device.

11. The fleet management system of claim 1, wherein the processor of the mobile communication device is further configured to execute the instructions to:

determine whether at least one or more of a duty status of the driver or the driver HOS exceeds an hours of service requirement threshold based at least in part on the vehicle data, the driver information, or the driver summary electronic report; and generate an HOS violation notification for the driver on the display of the mobile communication device.

12. The fleet management system of claim 1, wherein the command to initiate the file transfer of the copy of the driver summary electronic report to the external device is activated in a regulatory inspection mode that allows a law enforcement or a regulatory inspector to review the copy of the driver summary electronic report via the external device.

13. A method implemented by a mobile communication device, comprising:

receiving driver hours of service (HOS) information of a driver associated with a vehicle via a user interface of the mobile communication device;

receiving, via a short-range communication link, a vehicle data from an electronic onboard recorder (EOR) that is mounted inside the vehicle and is electronically coupled with a diagnostic port of an engine control module (ECM) of the vehicle via an input cable which electronically couples with a mating connector of the ECM within the vehicle, wherein the EOR captures the vehicle data associated the vehicle via the ECM and wirelessly communicates the vehicle data to the mobile communication device via a short-range wireless communication component embedded within the EOR;

storing the vehicle data received from the EOR in a memory of the mobile communication device;

generating a driver summary electronic report by processing the vehicle data received from the EOR and the driver HOS information;

presenting on a display screen of the mobile communication device at least one of: the vehicle data, the driver HOS information, or the driver summary electronic report to a user via the display;

receive, via the user interface, a command to initiate a file transfer of a copy of the driver summary electronic report to an external device using the short-range communication link; and cause the file transfer of the copy of the driver summary electronic report to the external device in response to receiving the command to initiate the file transfer, wherein the cause the file transfer of the copy of the driver summary electronic report to the external device comprises:

transmitting, via the short-range communication link, the copy of the driver summary electronic report from the mobile communication device to the EOR; and transfer the copy of the driver summary electronic report from the EOR to the external device for inspection.

14. The method of claim 13, wherein the driver summary electronic report includes the driver HOS information.

15. The method of claim 13, further comprising:

altering one of the driver information or the driver summary electronic report via the user interface of the mobile communication device that affects the driver HOS information.

16. The method of claim 13, further comprising:

determining whether at least one or more of a duty status of the driver or the driver HOS information exceeds an HOS requirement threshold based at least in part on the vehicle data, the driver information, or the driver summary electronic report; and generating an HOS violation notification for the driver on the display of the mobile communication device.

* * * * *